(12) United States Patent
Furukawa et al.

(10) Patent No.: US 7,620,820 B2
(45) Date of Patent: Nov. 17, 2009

(54) CONTENT DATA PROCESSING METHOD, RECORDING DEVICE, AND REPRODUCTION DEVICE

(75) Inventors: Shunsuke Furukawa, Tokyo (JP); Yoichiro Sako, Tokyo (JP); Tatsuya Inokuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 820 days.

(21) Appl. No.: 10/479,168

(22) PCT Filed: Apr. 2, 2003

(86) PCT No.: PCT/JP03/04237

§ 371 (c)(1),
(2), (4) Date: Dec. 1, 2003

(87) PCT Pub. No.: WO03/088055

PCT Pub. Date: Oct. 23, 2003

(65) Prior Publication Data

US 2004/0151324 A1     Aug. 5, 2004

(30) Foreign Application Priority Data

Apr. 2, 2002     (JP) .............................. 2002-099471

(51) Int. Cl.
*G06F 11/30* (2006.01)
(52) U.S. Cl. ...................... 713/189; 380/277; 380/278; 380/281; 713/193
(58) Field of Classification Search ......... 380/277–279, 380/280, 286, 281; 369/13.56; 713/193, 713/163, 189
See application file for complete search history.

(56) References Cited

U.S. PATENT DOCUMENTS 5,142,578 A * 8/1992 Matyas et al. ............... 380/280
5,812,664 A * 9/1998 Bernobich et al. .......... 380/278

FOREIGN PATENT DOCUMENTS

| JP | 9-134311 | 5/1997 |
| JP | 11-53310 | 2/1999 |
| JP | 11-274999 | 10/1999 |
| JP | 2000-293439 | 10/2000 |
| JP | 2000-357127 | 12/2000 |
| JP | 2001-305954 | 11/2001 |
| JP | 2001-357373 | 12/2001 |
| JP | 2002-15254 | 1/2002 |

OTHER PUBLICATIONS

"Joho Security Kanzen System Q & A", Electronics, Ohmsha, Ltd., May 1, 1996, vol. 41, No. 5, pp. 73 to 75.

* cited by examiner

*Primary Examiner*—Thanhnga B Truong
(74) *Attorney, Agent, or Firm*—Oblon, Spivak, McClelland, Maier & Neustadt, L.L.P.

(57) ABSTRACT

The present invention provides a data processing method for encrypting or decrypting contents data using contents key data. The method comprises generating the reference information including data encrypted from contents key data using a plurality of device key data proper to a plurality of apparatus, by encrypting the contents key data using the device key data associated with those of the plural apparatus for which recording or reproduction is allowed, supplying the generated reference information along with the device key data to the plural apparatus, decrypting the contents key data from the supplied reference information, by the plural apparatus, using the device key data proper to the plural apparatus, and encrypting or decrypting the contents data using the decrypted contents key data.

24 Claims, 13 Drawing Sheets

CONTENT DATA PROCESSING METHOD, RECORDING DEVICE, AND REPRODUCTION DEVICE

TECHNICAL FIELD

This invention relates to a data processing method for encrypting or decrypting contents data, using key data for contents data, a recording apparatus for recording encrypted contents data, and to a reproducing apparatus for reproducing the encrypted contents data.

This application claims priority of Japanese Patent Application No. 2002-099471, filed in Japan on Apr. 2, 2002, the entirety of which is incorporated by reference herein.

BACKGROUND ART

Up to now, data recording and/or reproducing apparatus, such as an IC recorder, employing a semiconductor memory as a recording medium, an MP3 (MPEG1 Audio Layer 3) recorder, an MO drive employing a magneto-optical disc, used in a personal computer, as a recording medium, or a CD drive employing a recording type optical disc as a recording medium, have been used. The recording medium used for this recording and/or reproducing apparatus may be mounted to or dismounted from the apparatus. The recording medium, that may be mounted to or dismounted from the recording and/or reproducing apparatus, need to be mounted to or dismounted from plural apparatus at least of the same sort. A large variety of contents data, such as music or motion pictures, are recorded on the recording mediums that may be mounted to or dismounted from the recording and/or reproducing apparatus. The recording medium, having recorded thereon a variety of contents data, proves to be an object of commercial transactions, by itself, and is circulated in the market.

With enhanced volume of transactions of the recording mediums, having recorded contents data thereon, illicit use or plagiarism of the contents data is also increasing.

For positively prohibiting the illicit use or plagiarism of the contents data under this situation, it is necessary that, even though the recording and/or reproducing apparatus are designed to allow the use of the same sort of the recording medium as that having recorded the contents data, only specified recording and/or reproducing apparatus, allowed for using the recording medium having recorded the contents data, are able to record and/or reproduce the contents data. That is, the recording medium, having the contents data recorded thereon, needs to be provided with the authenticating function of allowing only a specified recording and/or reproducing apparatus to record and/or reproduce the contents data recorded on the recording medium or to transmit the contents data.

As typical of the reciprocal authenticating system comprising a recording medium provided with this sort of the authenticating function and a recording and/or reproducing apparatus employing this sort of the recording medium, there is a system disclosed in Japanese Laying-Open Patent Publication H-11-265318. The reciprocal authenticating system, disclosed in this patent publication, uses such a method in which passwords are exchanged between the recording and/or reproducing apparatus and the recording medium, by way of performing reciprocal authentication, in order to check for accessibility of the apparatus to the recording medium. With this method, only a sole recording and/or reproducing apparatus is entitled to record and/or reproduce plural recording mediums, while it is not possible for plural authorized data recording and/or reproducing apparatus to record and/or reproduce plural recording mediums. For overcoming this deficiency, known authenticating functions use a method in which, for checking into accessibility of the plural recording and/or reproducing apparatus to the recording medium, the reference information is also recorded at the time of data recording on the recording medium for use for checking into accessibility to the recording medium. This reference information is the information set in advance for the recording and/or reproducing apparatus by the producer of the apparatus. This reference information includes, for example, the authentication information for coping with e.g. plural recording and/or reproducing apparatus.

This reference information is susceptible to adulteration. With this in mind, the known authentication system signs the reference information, stored in the recording medium, with a private key of the formulator of the reference information. On the other hand, the party exploiting the reference information verifies the signature with a public key to confirm the validity (authenticity) of the reference information.

For confirming the signature by the public key, a public key, demonstrated by the authentication authorities, as a third party organization, is routinely employed. On the equipment exploiting the reference information, such as the recording and/or reproducing apparatus, such a function must be mounted by means of which it is possible to confirm the authenticity of the signature. The result is that, with the conventional method, signature verification by the public key tends to be expensive.

DISCLOSURE OF THE INVENTION

It is therefore an object of the present invention to provide a novel data processing method for encrypting/decrypting contents data, capable of overcoming the aforementioned deficiency inherent in the above-mentioned conventional authentication system, a recording apparatus for recording the encrypted contents data, and a reproducing apparatus for reproducing the encrypted contents data.

It is another object of the present invention to provide a data processing method for encrypting/decrypting contents data, by means of which illicit use or plagiarizing of the contents data may be prohibited positively, a recording apparatus for recording the encrypted contents data, and a reproducing apparatus for reproducing the encrypted contents data.

It is still another object of the present invention to provide a data processing method for readily reliably authenticating a recording and/or reproducing apparatus, allowed to record and/or reproduce or transmit contents data recorded on the recording medium, a recording apparatus for recording encrypted contents data, and a reproducing apparatus for reproducing the encrypted contents data.

It is yet another object of the present invention to provide a data processing method for readily reliably authenticating plural recording and/or reproducing apparatus, allowed to record and/or reproduce or transmit contents data recorded on the recording medium, a recording apparatus encrypted contents data, and a reproducing apparatus for reproducing the encrypted contents data.

For accomplishing the above objects, the present invention provides a data processing method comprising generating the reference information including data encrypted from contents key data, using a plurality of supplied device key data proper to a plurality of apparatus, by encrypting the contents key data using the device key data associated with those of the plural apparatus for which recording or reproduction is allowed, supplying the generated reference information along with the device key data to the plural apparatus, the plural apparatus decrypting the contents key data from the supplied reference information, using the device key data proper to the plural apparatus, and encrypting or decrypting the contents data using the decrypted contents key data.

The apparatus include recording and/or reproducing apparatus employing a variety of recording mediums, such as IC recorders or disc-shaped recording and/or reproducing apparatus.

In the data processing method according to the present invention, the contents data are encrypted using the decrypted contents key data, and the encrypted data and the reference information are recorded on the recording medium.

In the plural apparatus used in the data processing method of the present invention, data for determining whether or not the supplied reference information is valid is pre-stored. The validity of the reference information is determined based on the data used for verifying the reference information read out from the recording medium.

If, in the data processing method of the present invention, the reference information supplied is determined to be valid, the contents key data is decrypted from the reference information using the device key data.

If, in the data processing method of the present invention, the reference information supplied is determined to be not valid, the subsequent processing operations are discontinued.

In the data processing method of the present invention, the verifying data is the key data used in encrypting the reference information.

In the data processing method according to the present invention, the device key data supplied and the reference information supplied are stored in a memory of each of the plural apparatus. In the plural apparatus, data used for determining whether or not the reference information supplied is valid is pre-stored, and the validity of the reference information supplied is verified based on the verifying data.

If, in the data processing method according the present invention, the reference information supplied has been determined to be valid, the version of the reference information supplied is compared to the version of the reference information stored in the memory and, when the version of the reference information supplied is newer than the version of the reference information stored in the memory, the reference information stored in the memory is updated to the supplied reference information.

If, in the data processing method according to the present invention, the reference information supplied has been determined to be not valid, the supplied reference information is discarded.

The verifying data, that is, the data used for verifying whether or not the reference information supplied is valid, is key data used in encrypting the reference information.

In the data processing method according to the present invention, the contents data is encrypted using the decrypted contents key data, digest data is prepared based on the reference information and the generated digest data, and encrypted data as well as the reference information are recorded on a recording medium.

In the data processing method according to the present invention, digest data is generated from the reference information read out from the recording medium, the so generated digest data is compared to the digest data read out from the recording medium and, if the generated digest data is coincident with digest data readout from the recording medium, the contents key data is decrypted using the device key data. If the generated digest data is not coincident with the digest data read out from the recording medium, the subsequent processing is discontinued.

The present invention also provides a data processing method comprising generating the reference information including data encrypted from contents key data, using a plurality of supplied device key data proper to a plurality of apparatus, by inserting invalid data in a location of data encrypted from the contents key data using the device key data associated with those of the plural apparatus for which recording or reproduction is not allowed, supplying the generated reference information along with the device key data to the plural apparatus, the plural apparatus decrypting the contents key data from the supplied reference information using the device key data proper to the plural apparatus, and encrypting or decrypting the contents data using the decrypted contents key data.

The present invention also provides a recording apparatus comprising a memory in which the reference information including data encrypted with device key data proper to the apparatus where recording of contents key data is allowed and the device key data are stored, a decrypting processing unit for decrypting the reference information using the device key data to output the contents data, an encryption processing unit for encrypting the contents data supplied, using the contents key data supplied from the decrypting processing unit, and a recording unit for recording output data from the encryption processing unit, along with the reference information, on a recording medium.

In the memory, data for verifying whether or not the reference information supplied is valid is pre-stored, and the validity is verified based on the data used for verifying the reference information newly supplied to the apparatus.

If the newly supplied reference information has been determined to be valid, the decrypting processing unit compares the version of the reference information newly supplied to the version of the reference information stored in the memory and, when the version of the reference information newly supplied is newer than the version of the reference information stored in the memory, the decrypting processing unit updates the reference information stored in the memory to the newly supplied reference information.

The recording apparatus according to the present invention further includes a generating unit for generating digest data based on the reference information. The recording unit records the generated digest data, encrypted data and the reference information on the recording medium.

The present invention also provides a reproducing apparatus comprising a memory having stored therein data for verifying whether or not the reference information including device key data and data encrypted with device key data proper to an apparatus, the recording of contents key data of which is allowed, a verifying unit for verifying whether or not the reference information, read out from a recording medium, having recorded thereon encrypted contents data and the reference information, is valid, using the verifying data, a first decrypting processing unit for decrypting the reference information, read out from the recording medium, using the device key data, to output the contents key data, if the verifying unit has determined that the reference information is valid, and a second decrypting processing unit for decrypting the encrypted contents data read out from the recording medium using the contents key data supplied from the first decrypting processing unit.

The first decrypting processing unit verifies the validity based on data for verifying the reference information newly supplied to the apparatus. If the newly supplied reference information has been determined to be valid, the first decrypting processing unit compares the version of the reference information newly supplied to the version of the reference information stored in the memory and, when the version of the reference information newly supplied is newer than the version of the reference information stored in the memory, the first decrypting processing unit updates the reference information stored in the memory to the newly supplied reference information.

The present invention also provides a reproducing apparatus comprising a memory having stored therein device key data, a generating unit for generating digest data, generated based on the reference information, from the reference information, read out from a recording medium, having recorded thereon the reference information, the digest data and encrypted contents data, the reference information including data encrypted with device key data proper to an apparatus, the recording of contents key data of which is allowed, a comparator unit for comparing the digest data generated by the generating unit to digest data read out from the recording medium, a first decrypting processing unit for decrypting the reference information read out from the recording medium, using the device key data, to output the contents key data, if the comparator unit has determined that the generated digest data is coincident with the digest data read out from the recording medium, and a second decrypting processing unit for decrypting encrypted contents data read out from the recording medium using the contents key data supplied from the first decrypting processing unit.

Other objects, features and advantages of the present invention will become more apparent from reading the embodiments of the present invention as shown in the drawings.

BEST MODE FOR CARRYING OUT THE INVENTION

Figure 1:
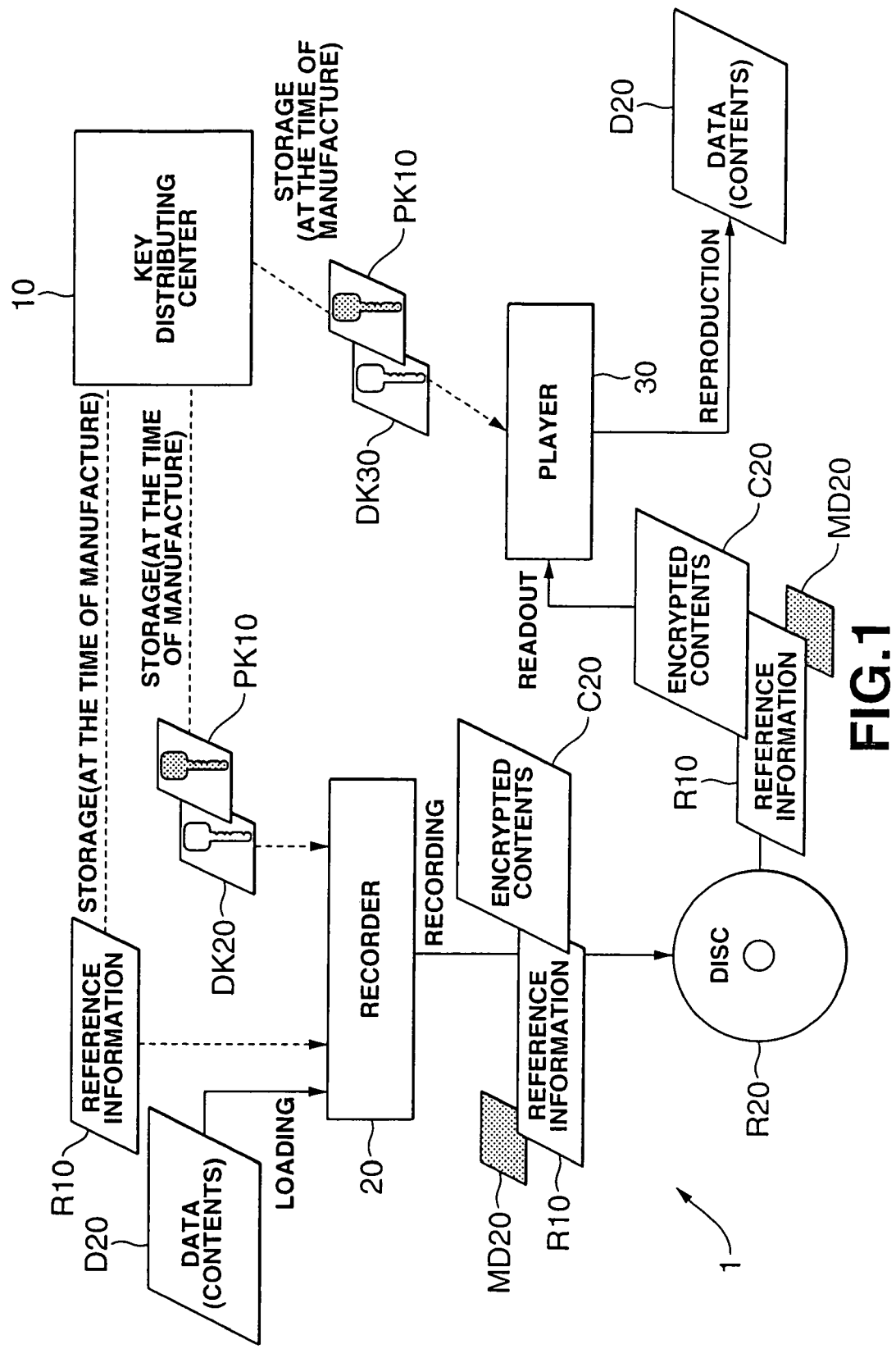
FIG. 1 is a block diagram showing the basic structure of a data transfer system according to the present invention.

First, the system for distributing contents data of for example music or motion pictures, using a recording medium or a communication network, such as the Internet, is explained. If, in the distribution system of this sort for contents data, the contents data is to be transmitted between two apparatus, such as personal computers having for example the communication function, or the contents data is to be transmitted from one recording and/or reproducing apparatus to another, with the interposition of a recording medium, it is usually practiced to verify the authenticity of the apparatus to which the contents data are transmitted, such as personal computer or recording and/or reproducing apparatus, using the information that allows recognition of the authenticity of the apparatus, and subsequently to transmit the contents data. The information that allows recognition of the authenticity of the apparatus means the information distributed for recognizing, by some means or other, that there exists the apparatus that is not desirable in supervising the overall system, and for realizing the function for negating the authenticity, built into the system from the outset. Among these information is the version information, such that the latest distributed information at all times may be discriminated so that the authenticity of the apparatus to which the contents data are transmitted may be recognized on the basis of the latest information.

In the present embodiment, the authenticity of the an apparatus when contents data are transmitted from a recording medium to the apparatus is carried out using for example the information peculiar to the embodiment now explained. It is noted that the information by which the authenticity of the apparatus may be verified means such information which, through controlling the authenticity (validity) of the peculiar information, disables transmission of contents data from the recording medium to the apparatus.

In the present embodiment, in verifying the authenticity of the apparatus employing the private key, the validity (authenticity) of the information itself is verified by introducing the message digest of the information, as distinct from the information for verifying the validity of the apparatus, into an inherent area on the recording medium. In the following, the structure according to the principle of the present embodiment and the respective functions are explained, first of all, and a specified illustrative method for verifying the validity of an apparatus, using a private key, in other words, the method for invalidating one or more specified apparatus and thereby disabling transmission of contents data from a recording medium to the apparatus, is then explained as a first embodiment. Next, an instance of employing a message digest for inspecting (verifying) the validity (authenticity) of the reference information itself is explained as a second embodiment.

In the following, preferred embodiments of the present invention are explained with reference to the drawings.

It should be noted that, in the explanation of the preferred embodiments, a number representing the discrimination of a Ckey key or a Dkey key is set in the "n" at the trailing end of a sequence of letters for key discrimination, such as Ckeyn or Dkeyn. Moreover, in the explanation of the present embodiment, the signature for proving the authenticity of the reference information R10 is generated at the time of preparation of the reference information R10, and the reference information R10, including this signature, is represented as the reference information R10. Additionally, the signature is encrypted by a person who formulated the reference information R10, using the formulator's own private key, with the authenticity of the signature being proved (verified) only by the public key PK10 of the formulator.

First, the basic structure of a data transmission system according to the present invention is explained with reference to FIG. 1.

The data transmission system 1 is made up by a key distributing center 10 for distributing key data deciphering the reference information R10, a recorder 20, as a recording apparatus for deciphering the reference information R10 to record data, and a player 30, as a reproducing apparatus for deciphering the reference information R10 to reproduce data, as shown in FIG. 1.

The key distributing center 10 distributes (stores) the reference information R10 for invalidating specified apparatus, a public key PK10 for authenticating the signature of the reference information R10 itself, and device key data DK20, proper to the apparatus, for deciphering the reference information R10, to the recorder 20, at the time of manufacture of the recorder 20. The authentication of the signature of the reference information R10 itself is termed below the verification of authenticity. The key distributing center 10 distributes the public key data PK10 and device key data DK30, proper to the apparatus, for deciphering the reference information R10, to the player 30, that is, causes the data to be stored in the player, at the time of manufacturing the player 30.

The roles of the respective information and key data are as follows: The reference information R10 is the information supplied from the key distributing center 10 at the time of manufacture of the recorder 20 for invalidating specified apparatus. If the number of the apparatus to be invalidated is increased, the reference information R10 is reissued from the key distributing center 10. Meanwhile, the reference information R10, furnished to the recorder using a disc as a recording medium, may also be supplied using a communication network, such as the Internet, or the like means. The device key (Dkey1) data DK20 is key data distributed (stored) by the key distributing center 10, at the time of manufacture of the recorder 20, for deciphering the reference information R10 for generating common key data. This common key data is referred to below as contents key data. It is noted that the contents key data is the common key data for encrypting/decrypting data D20 (referred to below as contents data). The contents data D20 is the meaningful information, such as music information. The public key data PK10 is key data distributed (stored) from the key distributing center 10, at the time of manufacture of the recorder 20 or the player 30, for verifying the authenticity of the signature of the reference information R10 itself by the private key data of the key distributing center 10. The device key (Dkey2) data DK30 is key data distributed (stored) from the key distributing center 10 at the time of manufacture of the player 30 as key data proper to the apparatus.

The recorder 20 deciphers the pre-stored reference information R10 with the device key data DK20 to generate contents key (Ckeyn) data used for encryption to encrypt the contents data D20 supplied thereto with the contents key (Ckeyn) data to generate encrypted contents data C20. The stored reference information R10 and the encrypted contents data C20 are recorded on a rewritable IC memory or a disc-shaped recording medium, such as disc R20.

It should be noted that the disc R20 is a recording medium on which to record data and includes a disc-shaped recording medium, such as an optical disc or a magneto-optical disc.

In order to cope with a case where the player 30 is an inexpensive apparatus that is unable to verify the signature by the public key data PK10, the recorder 20 generates message digest data MD20 from the reference information R10 to record the so generated message digest data along with the reference information R10 and the encrypted contents data C20 on the disc R20. Meanwhile, the functions of the recorder 20 will be explained in detail subsequently with reference to FIG. 2.

The player 30 verifies the signature of the reference information R10, recorded on the disc R20, by the public key data PK10, and deciphers the reference information R10 recorded on the disc R20 to verify the validity (authenticity). The player 30 also generates the same contents key (Ckeyn) as that used for encryption. Using these contents key (Ckeyn) data, the player 30 decrypts and reproduces the encrypted content key data C20 recorded on the disc R20. The player 30 is a player for reproducing e.g. music data. Meanwhile, if the player 30 is an inexpensive player, the signature of which cannot be verified by the public key data PK10, other message digest data are generated from the reference information R10 and the validity of the reference information R10 is verified on the basis of the coincidence of the two message digest data. The functions of the player 30 will be explained in detail subsequently by referring to FIG. 3.

The key distributing center 10 distributes the reference information R10 for invalidating a specified apparatus (including the signature for demonstrating the authenticity of the reference information as described above), the public key data PK10 for verifying the authenticity of the signature of the reference information R10, and the device key data DK20 for deciphering the reference information R10, to the recorder 20, adapted for recording the contents data D20 on a disc R20, at the time of manufacture of the recorder 20, as explained in the foregoing. The public key data PK10 and the device key data DK30 for deciphering the reference information R10 are distributed to the player 30, adapted for reproducing the contents data D20, at the time of manufacture of the player 30.

The reference information R10, including the signature, the public key data PK10 and the device key data DK20, distributed to the recorder 20 from the key distributing center 10, are stored by an internal memory, provided in the recorder 20. Should the contents data D20 for recording on the disc R20 be supplied to the recorder, the reference information R10 is deciphered, using the device key data DK20, to generate contents key (Ckeyn) data, which contents key data are encrypted, using the contents key (Ckeyn) data, to generate encrypted contents data C20. Based on the reference information R10, the message digest data MD20 is generated and the encrypted contents data C20, reference information R10, including the signature, and the message digest data MD20, are recorded on the disc R20.

The public key data PK10 and the device key data DK30, distributed from the key distributing center 10, are pre-stored in an internal memory of the player 30. In this player 30, the reference information R10, including the signature, message digest data MD20 and the encrypted contents data C20, stored on the disc R20, are read into the player 30, and the authenticity of the signature of the reference information R10 is verified by the public key data PK10. Alternatively, other message digest data is generated from the reference information R10, without verifying the signature by the public key data PK10, and these other message digest data and the message digest data MD20 are compared to each other in order to check for possible coincidence of the two message digest data. If the public key data PK10 is authentic, or if the these two message digest data are coincident with each other, the reference information R10 is deciphered, using the device key data DK30, to generate contents key (Ckeyn) data used for decrypting the encrypted contents data C20. By the so generated contents key (Ckeyn) data, the encrypted contents C20 are decrypted to reproduce the contents data D20.

In this manner, the plural apparatus may be checked at the time of data transmission as to validity effectively.

The respective functions of the recorder 20 and the player 30, making up the data transfer system of the present embodiment, are now explained with reference to the drawings.

Figure 2:
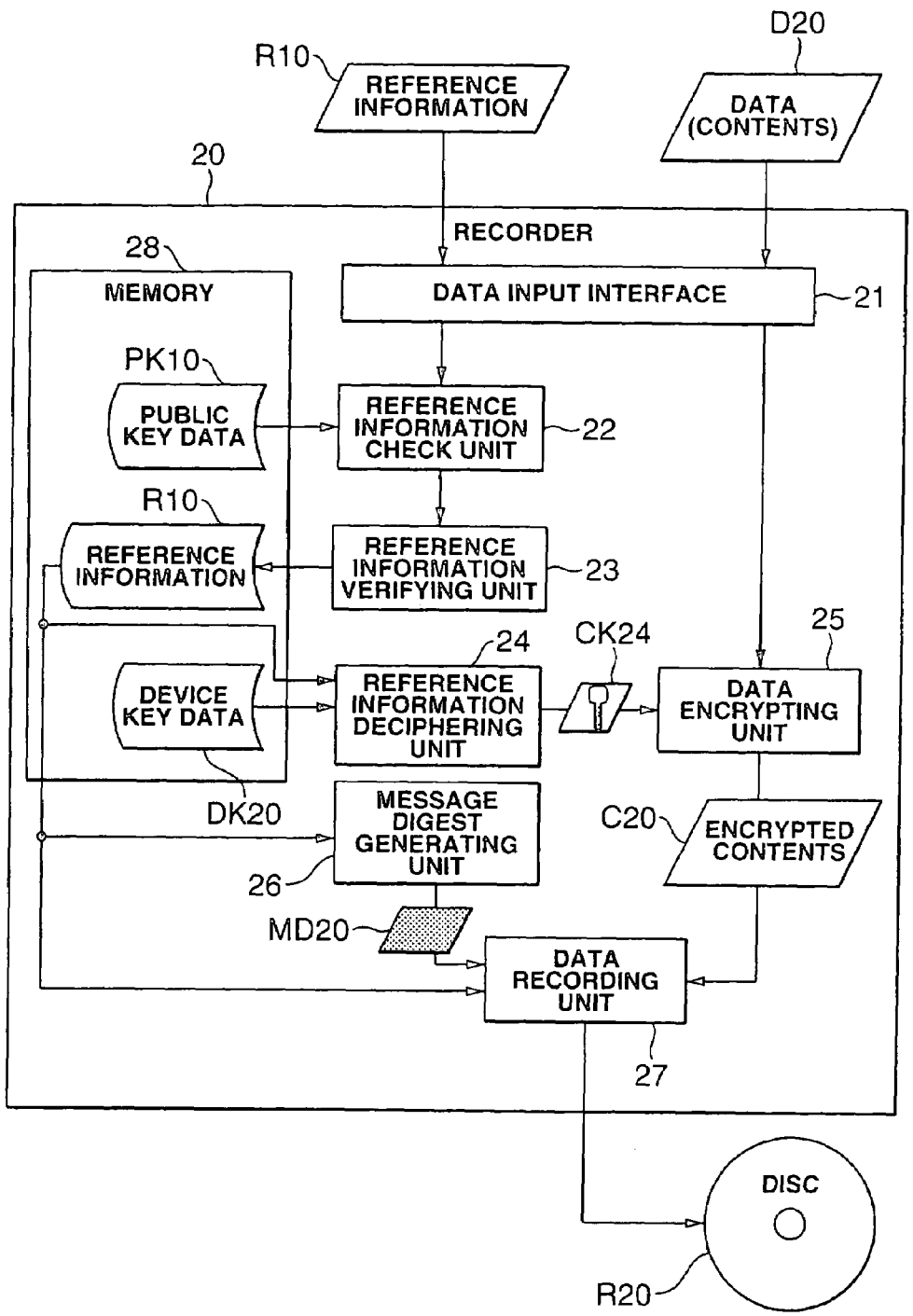
FIG. 2 is a block diagram showing a functional structure of a recorder used in the present invention.

FIG. 2 depicts a block diagram showing the functional construction of the recorder 20 according to the present invention.

The recorder 20 includes a data input interface 21, to which are supplied the reference information R10 and the contents data D20, a reference information check unit 22 for verifying the authenticity of the signature of the reference information R10, a reference information update unit 23, for updating the reference information R10, a reference information deciphering unit 24 for generating contents key data CK24 from the reference information R10, a data encrypting unit 25 for encrypting the contents data D20, a message digest generating unit 26 for generating message digest data MD20, a data recording unit 27 for recording the reference information R10, contents data D20 and the message digest data MD20 on the disc R20, and a memory 28 for storage of the respective data.

The data input interface 21 is connected to the reference information check unit 22 and to the data encrypting unit 25 and is supplied with external data, including the reference information R10 and the contents data D20. It is noted that this data input interface 21 is supplied with data in accordance with a preset communication system, and may be exemplified by for example SCSI (Small Computer System Interface). Thus, data read out from the recording medium may be supplied as external data to the data input interface 21. Or, the data may also be supplied by communication means to the input interface. This communication means may for example be a communication network, such as the Internet. Meanwhile, it should be possible to input data directly to the data input interface 21 without interposition of other devices. The data input interface 21 is supplied with the reference information R10, distributed from the key distributing center 10, and the so input reference information is output to the reference information check unit 22. Alternatively, contents data D20 for recording on the disc R20 loaded on the recorder 20 is input to the data input interface 21 and the so input contents data D20 is output to the data encrypting unit 25. Meanwhile, after shipment of the recorder 20, the distributed reference information R10 is distributed as the updated new reference information R10 from the key distributing center 10.

The reference information check unit 22 is connected to the data input interface 21, reference information update unit 23 and to the memory 28. For the signature of the new reference information R10, supplied from the data input interface 21, the reference information check unit 22 verifies the authenticity of the reference information, using the public key data PK10 stored in the memory 28. If the signature is just, that is authentic, the reference information check unit outputs the new reference information R10 to the reference information update unit 23. If the signature is unjust, that is not authentic, the reference information check unit terminates the processing, without doing anything, or discards the new reference information R10.

The reference information update unit 23 is connected to the reference information check unit 22 and to the memory 28, and updates the old reference information R10, stored in the memory 28, to the new reference information R10 supplied from the reference information check unit 22. If the signature is verified to be authentic, by the reference information check unit 22, and the new reference information R10 is supplied, the reference information update unit 23 compares the version number of the reference information R10 stored in the memory 28 to the version number of the new reference information R10. If the version number of the new reference information R10 is newer than the reference number stored in the memory 28, the reference information update unit 23 substitutes the new reference information R10 for the reference information R10 stored in the memory 28. If the version number of the new reference information R10 is older than the reference number stored in the memory 28, the reference information update unit 23 terminates the processing operation without doing anything. Alternatively, the reference information update unit 23 discards the new reference information R10.

The reference information deciphering unit 24 is connected to the data encrypting unit 25 and to the memory 28 and, using the device key data DK20, stored in the memory 28, deciphers the reference information R10 stored in the memory 28. If the contents data D20 is supplied to the data input interface 21, the reference information deciphering unit 24 deciphers the reference information R10, using the device key data DK20, to generate contents key data CK24. The so generated contents key data CK24 are sent to the data encrypting unit 25. The deciphering of the reference information R10 by the reference information deciphering unit 24 will be explained subsequently in detail with reference to FIG. 4.

The data encrypting unit 25 is connected to the reference information deciphering unit 24, data input interface 21 and to the data recording unit 27 to encrypt the contents data D20. The data encrypting unit 25 encrypts the contents data D20, delivered from the data input interface 21, using the contents key data CK24, supplied from the reference information deciphering unit 24, to generate encrypted contents data D20. Meanwhile, the encrypting processing is by the private key encryption system (conventional encryption system) which effects encryption/deciphering using a common key. The data encrypting unit 25 outputs the generated encrypted contents data C20 to the data recording unit 27.

The message digest generating unit 26 is connected to the data recording unit 27 and to the memory 28, and generates the message digest data MD20. If the contents data D20 is supplied to the data input interface 21, the message digest generating unit 26 generates message digest data MD20, based on the reference information R10 stored in the memory 28. The so generated message digest data MD20 is output to the data recording unit 27. It is noted that the message digest data MD20 may be prepared from the outset and stored in the memory 28.

The data recording unit 27 is connected to the data encrypting unit 25, message digest generating unit 26 and to the memory 28, and records the reference information R10, message digest data MD20 and the encrypted contents data C20 on the disc R20. When supplied with the encrypted contents data C20 from the data encrypting unit 25, the data recording unit 27 records the so supplied encrypted contents data C20 on the disc R20, along with the reference information R10 stored in the memory 28. Meanwhile, in recording the reference information R10, the message digest data MD20 supplied from the message digest generating unit 26 or also the message digest data MD20 pre-stored in the memory 28 are recorded simultaneously with these data on the disc R20.

The memory 28 is connected to the reference information check unit 22, reference information update unit 23, reference information deciphering unit 24, message digest generating unit 26 and to the data recording unit 27. The memory 28, in which to store the reference information R10, public key data PK10 and the device key data DK20, is also able to store the message digest data MD20. If the memory 28 simply stores the public key data PK10 and the device key data DK20, without rewriting the data, a ROM (read-only memory), for example, may be used as the memory 28. If the memory 28 is in need of rewriting, such as for storage of the reference information R19, a flash memory, for example, may be used as a read/write memory. Of course, both the ROM and the flash memory may be used as the memory 28. The reference information R10 is stored by the reference information update unit 23 and is supplied to the reference information deciphering unit 24, message digest generating unit 26 and to the data recording unit 27. The public key data PK10 is read-in by the reference information check unit 22. The device key data DK20 is read-in by the reference information deciphering unit 24. Meanwhile, the reference information R10, public key data PK10 and the device key data DK20 are distributed (stored) by the key distributing center 10 at the time of manufacture of the recorder 20. If the reference information R10 is updated and distributed by the key distributing center 10, the reference information is stored in the reference information update unit 23.

In the above-described structure of the recorder 20, the reference information deciphering unit 24 deciphers the stored reference information R10, using the device key data DK20, to generate the contents key data CK24 (Ckeyn) used for encryption. In the recorder 20, the data encrypting unit 25 encrypts the input contents data D20, using the contents key data CK24, to generate the encrypted contents data C20. In the recorder, the message digest generating unit 26 generates the message digest data MD20 from the stored reference information R10.

In the recorder 20, the data recording unit 27 records the stored reference information R10, the generated message digest data MD20 and the encrypted contents data C20 on the disc 20. Meanwhile, when the updated reference information R10 is newly distributed, the reference information check unit 22 and the reference information update unit 23 of the recorder 20 verify the signature of the updated new reference information R10 by the public key data PK10 and substitutes the updated new reference information R10 for the old reference information R10 to hold (store) the so substituted reference information.

In this manner, the information for verifying the validity of the apparatus may be recorded on a recording medium that may be read by other apparatus so that validity of the apparatus may be efficiently verified for plural apparatus.

Figure 3:
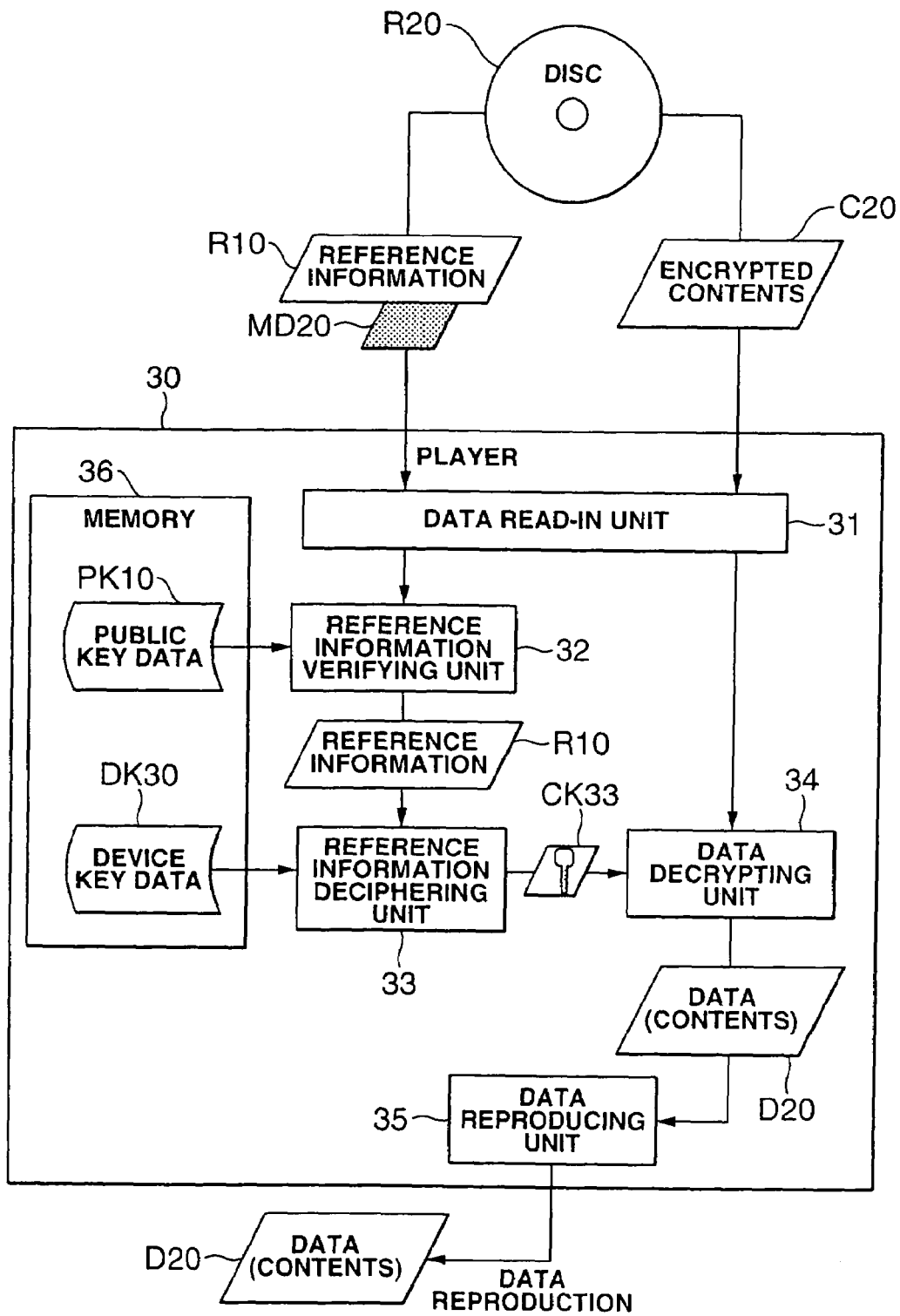
FIG. 3 is a block diagram showing a functional structure of a player used in the present invention.

FIG. 3 depicts a block diagram showing the functional construction of the player 30 according to the present invention.

The player 30 is made up by a data read-in unit 31 for reading in the reference information R10, message digest data MD20 and the encrypted contents data C20 from the disc R20, a reference information verifying unit 32 for verifying the authenticity of the signature of the reference information R10, a reference information deciphering unit 33 for generating the contents key data CK33 from the reference information R10, a data decrypting unit 34 for decrypting the encrypted contents data C20 to generate contents data D20, a data reproducing unit 35 for reproducing the decrypted contents data D20, and a memory 36 for storing the respective data.

The data read-in unit 31 is connected to the reference information verifying unit 32 and to the data decrypting unit 34, and reads in external data, such as the reference information R10, message digest data MD20 or the encrypted contents data C20, recorded on the disc R20. The data read-in unit 31 reads in the reference information R10, distributed from the key distributing center 10 and recorded on the disc R20, and the message digest data MD20, generated from the reference information R10 and similarly recorded on the disc R20, to output the so read-in data to the reference information verifying unit 32, while reading out the encrypted contents data C20 to output the readout data to the data decrypting unit 34.

The reference information verifying unit 32 is connected to the data read-in unit 31, reference information deciphering unit 33 and to the memory 36. The reference information verifying unit 32 verifies the authenticity of the signature of the reference information R10, delivered from the data read-in unit 31, by the data decrypting unit stored in the memory 36. If the signature is just, that is authentic, the reference information verifying unit 32 delivers the reference information R10 to the reference information deciphering unit 33 and, if the signature is unjust, that is not authentic, the reference information verifying unit terminates the processing operation, without doing anything. The reference information R10 may also be discarded. If the player 30 is to be operated as an inexpensive player, the reference information verifying unit 32 generates other message digest data from the reference information R10, supplied from the data read-in unit 31, without verifying the signature by the public key data PK10 stored in the memory 36. Moreover, the reference information verifying unit 32 compares the so generated other message digest data and the message digest data MD20, supplied from the data read-in unit 31, to each other, by way of verification. The reference information verifying unit 32 outputs the reference information R10 to the reference information deciphering unit 33, in case of coincidence of the two message digest data, while terminating the processing operation, without doing anything, in case of non-coincidence of the two message digest data. The reference information verifying unit 32 may also discard the reference information R10.

The reference information deciphering unit 33 is connected to the reference information verifying unit 32, data decrypting unit 34 and to the memory 36, and deciphers the reference information R10, stored in the memory 36, using the device key data DK30 stored in the memory 36. The reference information deciphering unit 33 deciphers the reference information R10, supplied from the reference information verifying unit 32, using the device key data DK30, to generate contents key data CK33 which is the same as the contents key data used for encryption. The so generated contents key data CK33 is output to the data decrypting unit 34. The deciphering of the reference information R10 by the reference information deciphering unit 33 will be explained in detail subsequently with reference to FIG. 4.

The data decrypting unit 34 is connected to the reference information deciphering unit 33, data read-in unit 31 and to the data reproducing unit 35 to decrypt the encrypted contents data C20. The data decrypting unit 34 decrypts the encrypted contents data C20, supplied from the data read-in unit 31, using the contents key data CK33, supplied from the data read-in unit 31, to generate contents data D20. Meanwhile, this decrypting processing is in accordance with the private key encryption system which performs encryption/decryption using common key data. The data decrypting unit 34 outputs the so generated contents data D20 to the data reproducing unit 35.

The data reproducing unit 35 is connected to the data decrypting unit 34 to reproduce the contents data D20. When supplied with the contents data D20 from the data decrypting unit 34, the data reproducing unit 35 reproduces data as meaningful information. When the information is e.g. the music information, reproduction herein denotes the operation of converting the information into analog audio signals by a D/A converter, and of supplying the resulting analog audio signals through an amplifier to an electro-acoustic transducer, such as a loudspeaker, for allowing the outputting of the resulting audible sound. If the information is the file-type information, such as pictures or letters, it is transmitted to a file system.

The memory 36 is connected to the reference information verifying unit 32 and the reference information deciphering unit 33 and causes the public key data PK10 and the device key data DK30 to be stored therein. If the memory 36 simply causes the public key data PK10 and the device key data DK30 to be stored therein, without performing data rewrite operations, a recording medium dedicated to read-in, such as ROM (read-only memory), may be used. The public key data PK10 is read-in by the reference information verifying unit 32. The device key data DK30 is read-in by the reference information deciphering unit 33. It should be noted that the public key data PK10 and the device key data DK30 are pre-distributed and stored in the memory by the key distributing center 10 at the time of manufacture of the player 30.

The player 30, constructed as described above, verifies the authenticity of the signature of the reference information R10, recorded on the disc R20, using the public key data PK10. If the authenticity of the signature of the reference information R10 has been verified, the player 30 deciphers the reference information R10, recorded on the disc R20, to verify its validity (authenticity) to generate contents key data CK33 (Ckeyn) which is the same as that used in encryption. The player 30 decrypts the encrypted contents data C20, recorded on the disc R20, using the generated contents key data CK33, to generate contents data D20. If the player 30 does not have the function of verifying the authenticity of the signature of the reference information R10 by the public key data PK10, the message digest data MD20 recorded on the disc R20 is compared to the other message digest data generated by the player 30. If these two message digest data coincide with each other, the reference information R10 is verified to be valid (authentic).

In this manner, the validity (authenticity) of the reference information can be verified, even with the inexpensive data reproducing apparatus incapable of verifying the authenticity of the signature of the reference information using the public key data, thus enabling the validity of the plural apparatus to be verified efficiently at low cost.

A typical instance of the reference information R10 for invalidating an apparatus is now explained with reference to FIGS. 4 and 5. It is noted that not only the reference information R10 but the deciphering method is explained with reference to FIG. 5.

Figure 4:
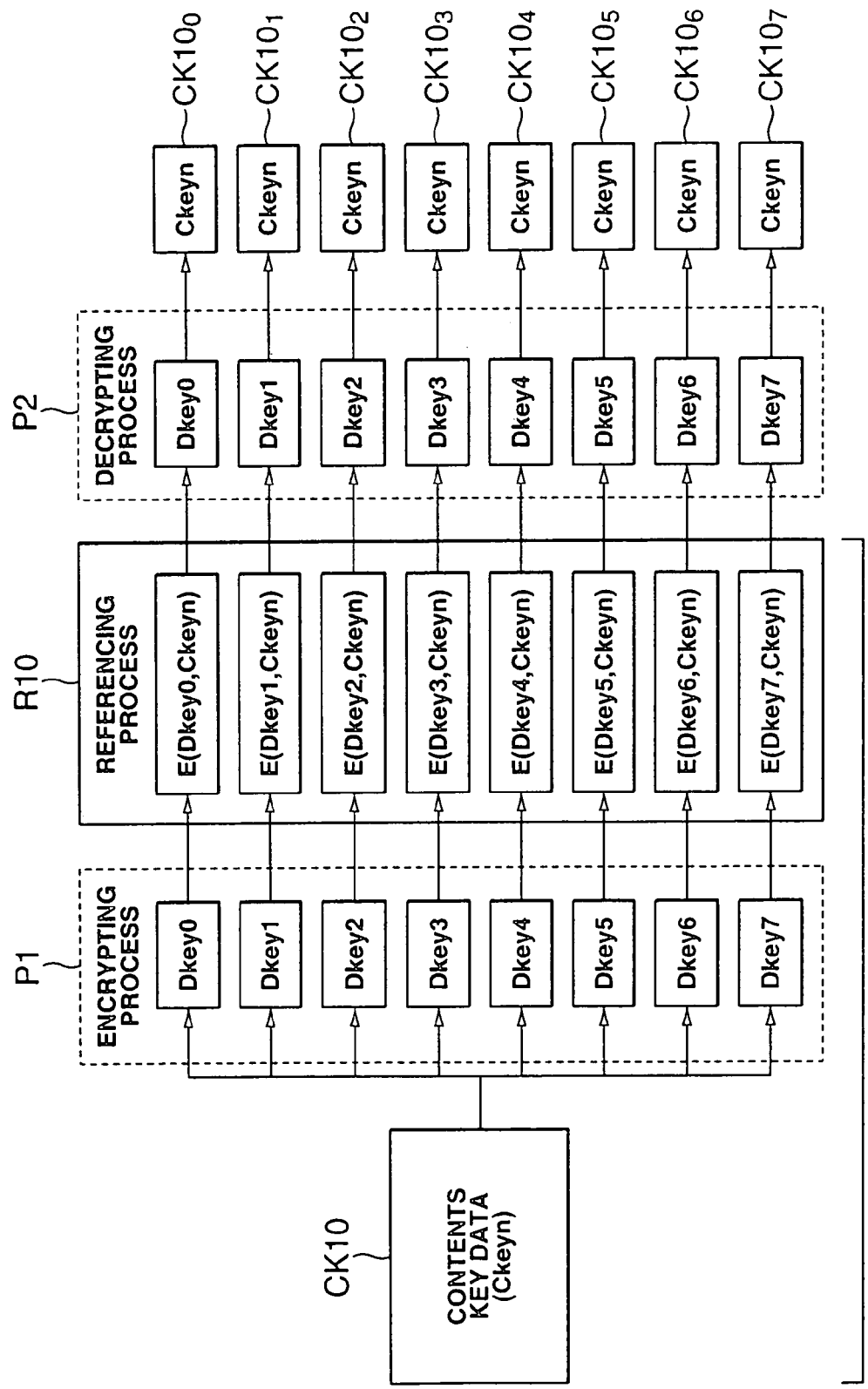
FIG. 4 shows the encrypting/decrypting process in the data transmission system according to the present invention.

FIG. 4 shows the process of encryption/decryption of the reference information in the data transmission system of the present invention. Meanwhile, in the explanation of FIG. 4, the contents key data CK10 and the contents key data $CK10_0$ to $CK10_7$ are the same key data with the same identifying letters Ckeyn. The contents key data CK10 and the contents key data $CK10_0$ to $CK10_7$ are also the same as the aforementioned contents key data CK24 and CK33. In the explanation relevant to FIG. 4, the totality of the contents key data are expressed with two sorts of the data, that is the contents key data CK10 (on the side of the formulating party of the reference information) and the contents key data $CK10_0$ to $CK10_7$ (on the side of the deciphering party of the reference information).

Referring to FIG. 4, the contents key data CK10 (Ckeyn) is the key data used only for encrypting the encrypted contents data recorded on the disc R20. Although the contents data can be encrypted using only this key data, other key data are generally employed in combination with this key data, such that, except if the totality of the key data are in order, it is impossible to decrypt the encrypted contents data. The encrypting process P1 is the process of encrypting the contents key data CK10 (Ckeyn) with the device key data of from Dkey0 to Dkey7. This encryption is executed in general in the key distributing center 10 such that the reference information R10 is generated. In the reference information R10, E(Dkeyn, Ckeyn) represents the contents key data CK10 encrypted with the device key data Dkeyn. The decryption process P2 is the decrypting process in which the contents key data $CK10_0$ to $CK10_7$ (Ckeyn), used for encrypting the contents data, are taken out by the respective apparatus from the received reference information R10, using the device key data (Dkeyn) owned by the respective apparatus.

It should be noted that the respective apparatus possess the sole own device key data (Dkeyn), so that the respective apparatus take out the portions of the reference information R10 relevant to themselves to decrypt the so taken out portions with the own device key data (Dkeyn).

It should be noted that the portions of the reference information relevant to the respective apparatus themselves may readily be identified by sequentially arraying the encrypted information in accordance with a preset protocol. Of course, the validity (authenticity) of the reference information R10 is to be verified by verifying the authenticity of the signature, not shown, appended to the reference information R10, and which has been applied with the private key data of the key distributing center 10, not shown, using the public key data PK10 of the key distributing center 10, as already explained with reference to FIG. 1.

The encrypted contents data, read out from the disc R20, is decrypted, using the contents key data $CK10_0$ to $CK10_7$ (Ckeyn) used for encrypting the contents data. If the contents data has been encrypted using other key data in combination with the above contents key data, the contents data are decrypted using the same combination. In FIG. 4, the device key data (Dkeyn), used for encryption and decryption is allocated to each of eight apparatus and is provided by the key distributing center 10 at the time of manufacture of the respective apparatus. These device key data (Dkeyn) are distributed as shown in FIG. 1, as explained with reference to FIG. 1. The respective apparatus are able to acquire the same contents key data $CK10_0$ to $CK10_7$ (Ckeyn) by reading and decrypting the particular portions of the reference information R10, using the device key data (Dkeyn), as described above.

The sequence of operations for invalidating the apparatus is hereinafter explained with reference to FIG. 5.

Figure 5:
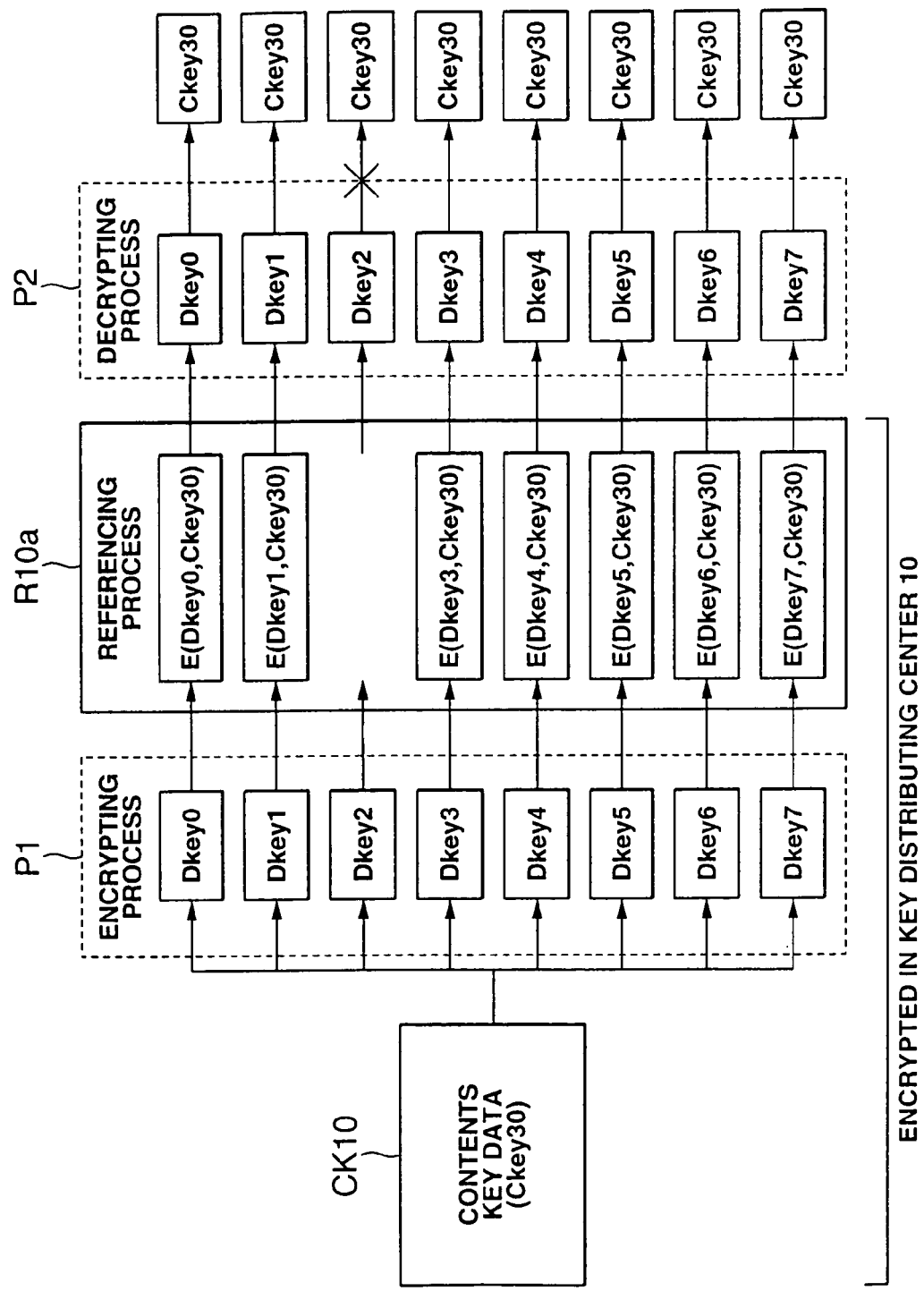
FIG. 5 shows the sequence of operations for invalidating apparatus that go to make up the data transmission system according to the present invention.

FIG. 5 shows the sequence of operations for invalidating the apparatus shown in FIG. 4. Meanwhile, in the explanation of FIG. 5, the contents key data CK10 is the same key data as the contents key data $CK10_0$ $CK10_1$ and $CK10_3$ to $CK10_7$ with the same identifying letters Ckey30.

Figures 6A, 6B:
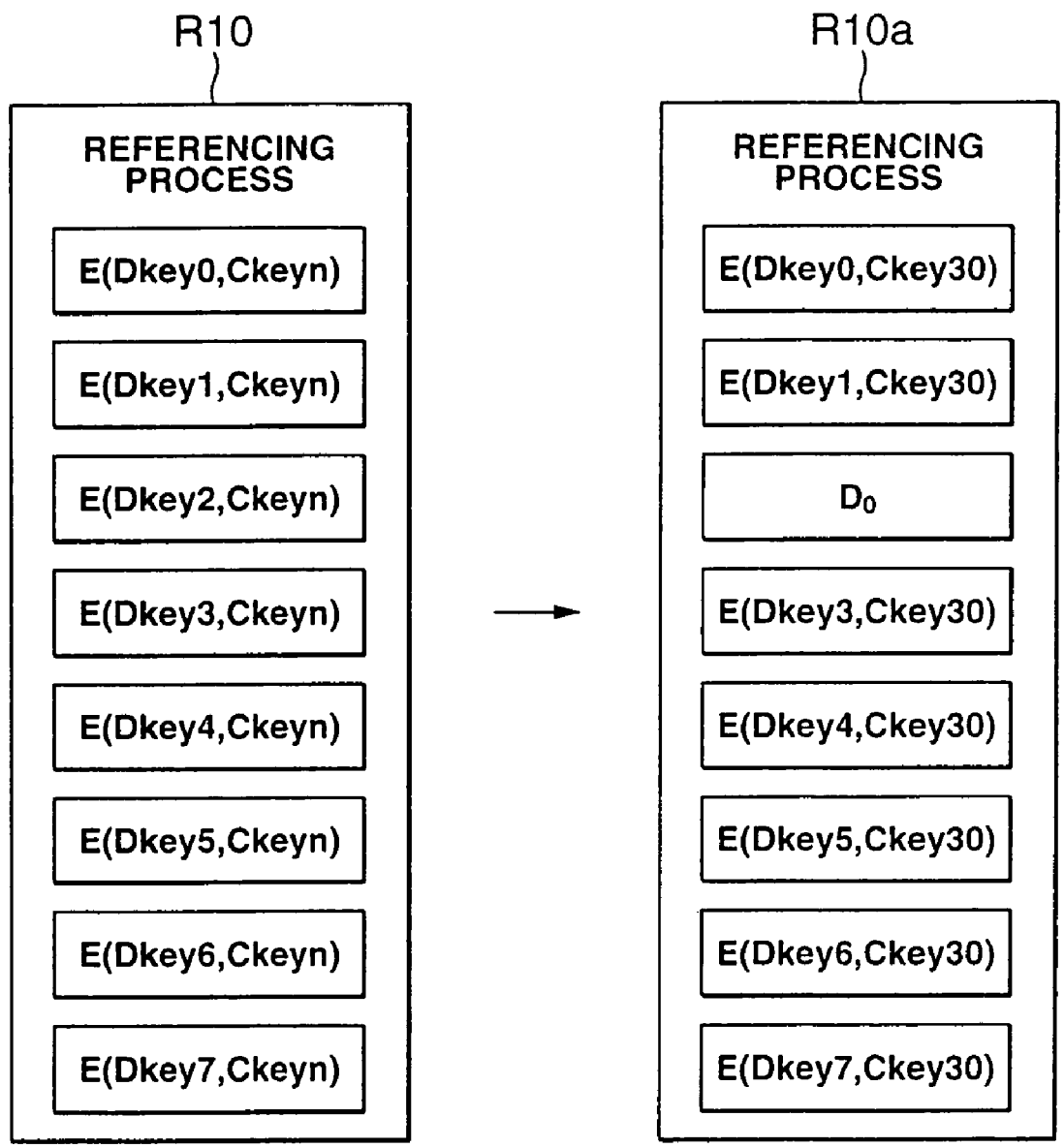
FIG. 6A shows the reference information R10 owned by the respective apparatus and FIG. 6B shows an instance wherein dummy data $D_0$ has been inserted in a location where E (Dkey2, Ckeyn) included in the reference information R10a is to be entered.

If the validity of a certain apparatus, such as a player 30 having the device key data Dkey2, is to be negated, encryption with the device key data Dkey2, to be executed at the time of preparing the reference information R10a during the encryption process P1, is not executed. Specifically, no data is inserted, as shown in FIG. 5, or nonsensical information (dummy data) $D_0$ is inserted, as shown in FIG. 6B, in a location of the reference information R10a where E (Dkey2, Ckeyn) is scheduled to be entered (FIG. 6A). The reference information R10a, thus formulated, is accorded with the latest version number, signed and forwarded to the recorder 20 over a communication network, such as the Internet, or recorded on the disc R20, as the reference information R10a, which then is supplied to the recorder 20. It is assumed that the recorder 20 has device key data other than Dkey2, for example, Dkey1. The recorder 20 compares the version number of the reference information R10a it already owns and the version number of the newly received reference information R10a, to each other, to substitute the newly received reference information R10a for the old reference information. In the decrypting process P2, the contents key data (Ckeyn) can be obtained by Dkey1, using this reference information R10a. Thus, the contents data are encrypted, using the contents key data (Ckeyn); and the so encrypted contents data are recorded on the disc R20, at the same time as the reference information R10a itself is recorded on the disc R20. If it is then attempted to reproduce this disc R20 by a player 30 having the device key data Dkey2, the player 30 is unable to obtain Ckeyn, as correct contents key data, by the device key data Dkey2, and hence is unable to decrypt the encrypted contents data. This is the negation of the validity of the apparatus explained here. That is, the apparatus, the validity of which has been negated by the reference information R10a, is no longer able to decrypt the encrypted contents data read out from the disc R20 to verify the contents data or reproduce the contents data.

If an apparatus, the validity of which has been negated, is a recorder, and the apparatus of interest, such as the recorder 20, has the device key data Dkey2, encryption by the device key data Dkey2 is not executed, in the same way as when the reference information R10 is prepared in the encryption process P1. That is, no data is inserted, as shown in FIG. 6A, or nonsensical information is inserted, as shown in FIG. 6B, in a location of the reference information R10a where E (Dkey2, Ckeyn) is scheduled to be entered. The reference information R10a, thus formulated, is accorded with the latest version number, signed and forwarded to the recorder 20 over a communication network, such as the Internet, or recorded on the disc R20 as the reference information R10a, which then is supplied to the recording sheet recorder 20. The recorder 20 compares the version number of the reference information R10a it already owns and the version number of the newly received reference information R10a, to each other, to substitute the newly received reference information R10a for the old reference information. In the decrypting process P2, attempts are made to acquire contents key data (Ckeyn), by the disc key data Dkey2, using this reference information R10a. However, only some or other nonsensical key data may be acquired. The "nonsensical key data" herein means that, with the key data, the contents key data common to those of the other apparatus cannot be acquired. Thus, if the contents data are encrypted, using the key data, and the so encrypted contents data is recorded on the disc R20, at the same time as the reference information R10a itself is recorded on the disc R20, which disc R20 then is loaded on the player 30 having e.g. the disc key data Dkey3 for replay, the player 30 is unable to obtain the key, used by the recorder 20 for encrypting the contents data, with the key data Dkey3. As a consequence, the player 30 is unable to decrypt the encrypted contents data. The above is the negation of the validity of the apparatus which is the recorder 20. That is, the apparatus, the validity of which has been negated by the reference information R10a, is no longer able to exchange encrypted contents data with other apparatus using the disc R20.

[Specified Method of Use of the Present Invention 1]

A method of using the data transmission system of the present invention 1 is now specifically explained. First of all, by referring to a flowchart, the first basic operation of the data transfer system of the present invention is now explained.

Figure 7:
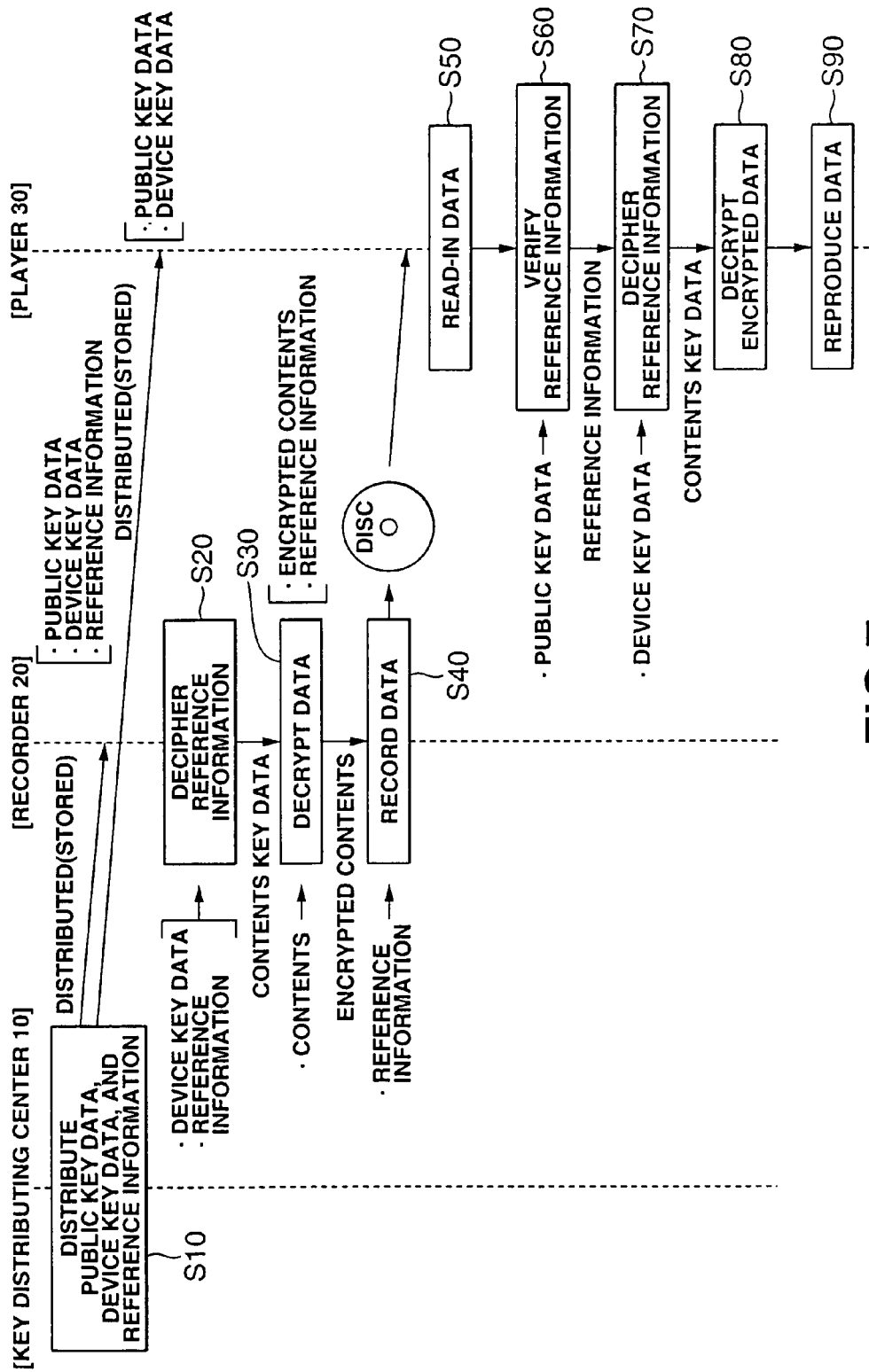
FIG. 7 is a flowchart showing a first basic operation of the data transmission system according to the present invention.

FIG. 7 depicts the first basic operation of the data transmission system of the present invention. Meanwhile, in the following explanation of the flowchart, reference is made to the names of the various apparatus and functions of FIGS. 1 to 3.

[Step S10]

In the key distributing center 10, the public key data PK10, device key data DK20 and the reference information R10 are distributed to the recorder 20, at the time of manufacture of the recorder 20, so as to be stored in the memory 28. In the key distributing center 10, the public key data PK10 and the device key data DK30 are distributed to the player 30 in advance, at the time of manufacture of the player 30, so as to be stored in a memory 36.

[Step S20]

When the contents data D20 are first supplied to the recorder 20 through the data input interface 21, the reference information deciphering unit 24 deciphers the reference information R10, stored in the memory 28, using the device key data DK20, similarly stored in the memory 28. The reference information deciphering unit 24 deciphers the reference information R10, distributed and stored in the step S10, using the device key data DK20, to generate the contents key data CK24. The so generated contents key data CK24 is output to the data encrypting unit 25. Meanwhile, a boot trigger for the reference information deciphering unit 24 may be afforded by the recorder 20. It is also possible to hold the generated contents key data CK24 for use when the D20 have been supplied.

That is, the recorder 20 generates the contents key data CK24, used for encrypting the contents data, using the device key data DK20, owned by no other than the recorder 20, from the reference information R10, input via the data input interface 21.

For verifying the validity of the reference information R10, the signature entered by the private key data of the key distributing center 10, appended to the reference information R10, is verified, using the public key data PK10 of the key distributing center 10.

[Step S30]

The data encrypting unit 25 in the recorder 20 encrypts the contents data D20. The data encrypting unit 25 encrypts the contents data D20, supplied from the data input interface 21, using the contents key data CK24, supplied in the step S20 from the reference information deciphering unit 24, to generate the encrypted contents data C20. The data encrypting unit 25 delivers the generated encrypted contents data C20 to the data recording unit 27.

[Step S40]

The data recording unit 27 in the recorder 20 records the reference information R10 and the contents data D20 on the disc R20. It is noted that, when supplied in the step S30 with the encrypted contents C20 generated by the data encrypting unit 25, the data recording unit 27 records the supplied encrypted contents C20 on the disc R20, along with the reference information R10 stored in the memory 28.

[Step S50]

The data read-in unit 31 of the player 30 reads in external data, such as the reference information R10 or the encrypted contents data C20, recorded on the disc R20, in the step S40. When the disc R20 is loaded on the player 30, the data read-in unit 31 reads-in the reference information R10, recorded on the disc R20, and which has been distributed from the key distributing center 10, to output the read-in information to the reference information verifying unit 32. The data read-in unit reads-in the encrypted contents data C20, recorded on the disc R20, to output the read-in data to the data decrypting unit 34.

[Step S60]

The reference information verifying unit 32 in the player 30 in a step S50 verifies the signature of the reference information R10, supplied from the data read-in unit 31 in the step S50, by the public key data PK10 stored in the memory 36. If the signature of the reference information R10 is just, that is authentic, the reference information verifying unit 32 delivers the reference information R10 to the reference information deciphering unit 33 and, if the signature is unjust, that is not authentic, the reference information verifying unit 32 terminates the processing operation, without doing anything. The reference information R10 may also be discarded.

[Step S70]

The reference information deciphering unit 33 in the player 30 performs the processing of deciphering the reference information R10, supplied from the reference information verifying unit 32 in the step S60, using the device key data DK30 stored in the memory 36 in the step S10. The reference information deciphering unit 33 performs the processing of deciphering the reference information R10, supplied from the reference information verifying unit 32, by the same contents key data CK33 used for encrypting the contents data D20. The reference information deciphering unit 33 outputs the generated contents key data CK33 to the data decrypting unit 34. The details of the deciphering operation for the reference information R10 by the reference information deciphering unit 33 are as described with reference to FIG. 4. That is, the deciphering operation for the reference information R10 by the reference information deciphering unit 33 is carried out on the signature accorded by the private key data PK10 of the key distributing center 10 which has been appended to the reference information R10.

[Step S80]

The data decrypting unit 34 in the player 30 executes the processing of decrypting the encrypted contents data C20. That is, the data decrypting unit 34 in a step S50 decrypts the encrypted contents data C20, delivered from the reference information deciphering unit 33 in the step S50 from the data read-in unit 31, using the contents key data CK33, delivered in the step S70 from the reference information deciphering unit 33, to decrypt and generate the contents data D20. The data decrypting unit 34 outputs the generated contents D20 to the data reproducing unit 35.

[Step S90]

The data reproducing unit 35 in the player 30 reproduces the contents data D20. When supplied with the contents data D20 in the step S80 by the data decrypting unit 34, the data reproducing unit 35 reproduces the data as the meaningful information. When the information is e.g. the music information, the information is converted into analog audio signals by a D/A converter, the resulting analog audio signals are supplied through an amplifier to a loudspeaker so as to be output as the audible sound. If the information is the file-type information, such as pictures or letters, it is transmitted to a file system.

Figure 8:
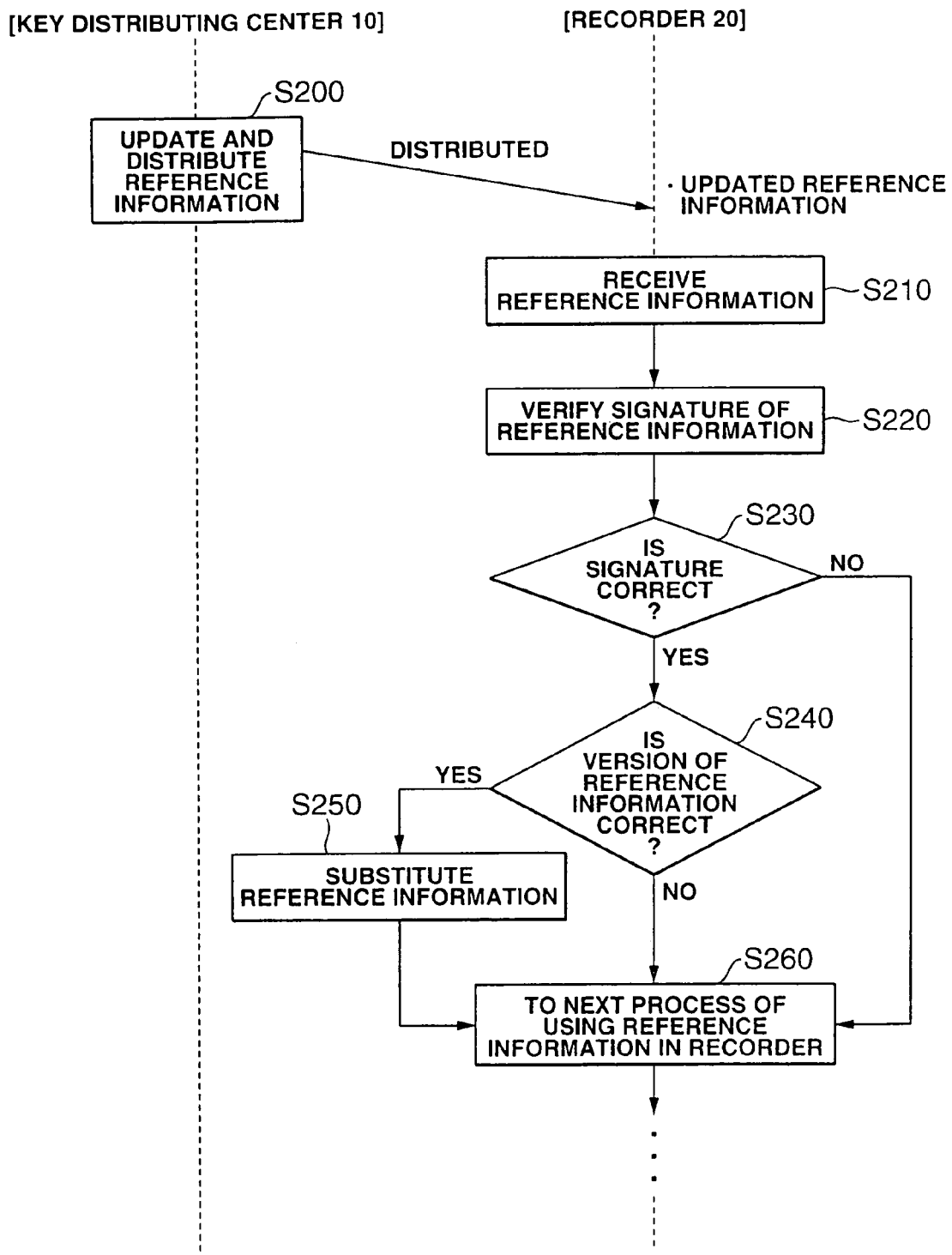
FIG. 8 is a flowchart showing the operation in case the updated reference information has been distributed to the recorder in the data transmission system according to the present invention.

FIG. 8 depicts a flowchart showing the operation in case the updated reference information R10 has been distributed to the recorder 20 in the data transmission system according to the present invention. It is noted that the explanation of the present flowchart is made by referring to the respective apparatus shown in FIGS. 1 to 3 and to the functions of the respective apparatus.

[Step S200]

The key distributing center 10 distributes the updated new reference information R10 to the recorder 20. This new reference information R10 may be distributed by a variety of techniques, such as by replay-only disc, throughout the manufacturing process of the replay-only disc, by being recorded on a recordable disc, or over a communication network, such as the Internet.

[Step S210]

The data input interface 21 in the recorder 20 is supplied with the reference information R10, distributed in the step S200. The data input interface 21 is supplied with the reference information R10, distributed in the step S200. The data input interface 21 is supplied with the reference information R10, distributed from the key distributing center 10, so as to be output to the reference information check unit 22.

[Step S220]

The reference information check unit 22 in the recorder 20 verifies the authenticity of the signature of the new reference information R10, supplied in the step S210 from the data input interface 21, using the public key data PK10, which is stored in the memory 28 and which has been distributed by the key distributing center 10.

[Step S230]

If the signature of the new reference information R10 is just, that is authentic, the reference information verifying unit 22 delivers the new reference information R10 to the reference information deciphering unit 23 and, if the signature is unjust, that is not authentic, the reference information verifying unit terminates the processing operation, without doing anything. The reference information R10 may also be discarded. That is, if the verification of the supplied new reference information R10 has resulted in a failure, the reference information R10 is deemed not to have been received, such that processing transfers to the next process without changing the reference information. If the verified signature of the new reference information R10 is just, processing transfers to a step S240 and, if otherwise, processing transfers to a step S260.

[Step S240]

In the recorder 20, when the new reference information R10 is supplied in the step S230 from the reference information verifying unit 22, the reference information update unit 23 compares the version number of the old reference information R10 stored in the memory 28 to the version number of the new reference information R10. If the version number of the new reference information R10 is newer, processing transfers to a step S250 and, if otherwise, processing transfers to a step S260.

[Step S250]

Since it has been verified that the version number of the new reference information R10, supplied in the step S240, is newer than the version number of the reference information R10, stored in the memory 28, the reference information update unit 23 updates the old reference information R10, stored (saved) in the internal memory 28 of the recorder 20, to the new reference information R10 supplied in the step S230 from the reference information check unit 22, by way of substitution.

[Step S260]

Since it has been verified in the step S240 that the version number of the new reference information R10 supplied is older than the version number of the reference information R10 stored in the memory 28, the processing of updating the reference information by the reference information update unit 23 is not performed. Alternatively, the new reference information R10 may be discarded. The next processing, that is the processing of deciphering the reference information or the data recording processing, employing the reference information R10 saved a second time in the recorder 20, is carried out.

Here, it has been explained that the contents data are encrypted, using the contents key data (Ckeyn), or the contents data are encrypted, using the contents key data in combination with other key data. It is however possible to provide a table of a number of keys encrypted from contents data and the contents data associated with the keys and to encrypt the table by the contents key data (Ckeyn), or to encrypt the tale in combination with the other key data, in which case it is again possible to negate the validity of a given apparatus as in the above-described embodiment. In this case, the table cannot be decrypted and hence the key data encrypted from contents data cannot be obtained so that the encrypted contents data cannot be decrypted with the consequence that the validity can be negated. This method is particularly effective when the reference information is to be renewed for post-writing new contents data on the same disc, because the key data encrypted from the previous contents data can directly be used without changes. Meanwhile, in the specified method of use of the present invention 2, which will be explained subsequently, a number of key data, encrypted from several contents data, are arranged as a table in which the key data are associated with the contents data, this table being encrypted by contents key data (Ckeyn).

In the foregoing explanation, the contents data D20 are encrypted by contents key data (common key data). It is however also possible to generate key data by a random number generator and to encrypt the contents data D20 by the so generated key data. Although any sort of random numbers, generated by this random number generator, may be used, pseudo random numbers, in which similar random numbers are generated if the information, such as input parameters is the same, are particularly desirable.

In this manner, the mechanism in which the respective apparatus acquire common key data from the reference information by the device key data owned by the respective apparatus, the encrypted contents data are decrypted using the so acquired common key data, or key data for decrypting the encrypted contents data is acquired (scheme for negating the validity of given apparatus), and the reference information, may be used as the mechanism for negating the validity of given apparatus and as the reference information, respectively.

The reference information R10, distributed from the key distributing center 10, shown in FIG. 1, to the recorder 20, includes the version information, as described above, and is signed by the private key data of the key distributing center 10. The recorder 20 first verifies the signature and thereby verifies the validity (authenticity) of the reference information R10. The recorder then compares the version number, contained in the reference information R10, verified by the signature of the reference information R10, determined to be just, to the version number of the reference information R10 saved in the recorder 20. If the new reference information R10 is newer than the reference information saved in the recorder 20, the new reference information is substituted. In this manner, the reference information R10, based on which to verify the validity of the apparatus at all times, is updated to and maintained at all times at the newest reference information R10.

Here, description has been made of the typical mechanism for negating the validity of the apparatus (scheme for negating the validity of the apparatus) and an instance of the reference information R10. However, the mechanism or the reference information R10 is not limited to that described in the foregoing, it being sufficient if there is provided the reference information R10.

[Specified Method of Use of the Present Invention 2]

Turning to the verification of the validity (authenticity) of the reference information R10, the method by signature verification is rather expensive. In the explanation with reference to FIGS. 7 and 8, verification of the validity (authenticity) of the reference information R10 is by verification of the signature by the private key data of the key distributing center 10. The signature verification, which is high in reliability, is also costly. Thus, for realization of an inexpensive player 30, message digest data is used for verifying the validity (authenticity) of the reference information R10.

The specified method of use of the present invention 2, in which the message digest data is used for verifying the validity (authenticity) of the reference information R10, is now explained.

First, the message digest data is specifically explained by referring to the drawings.

Figure 9:
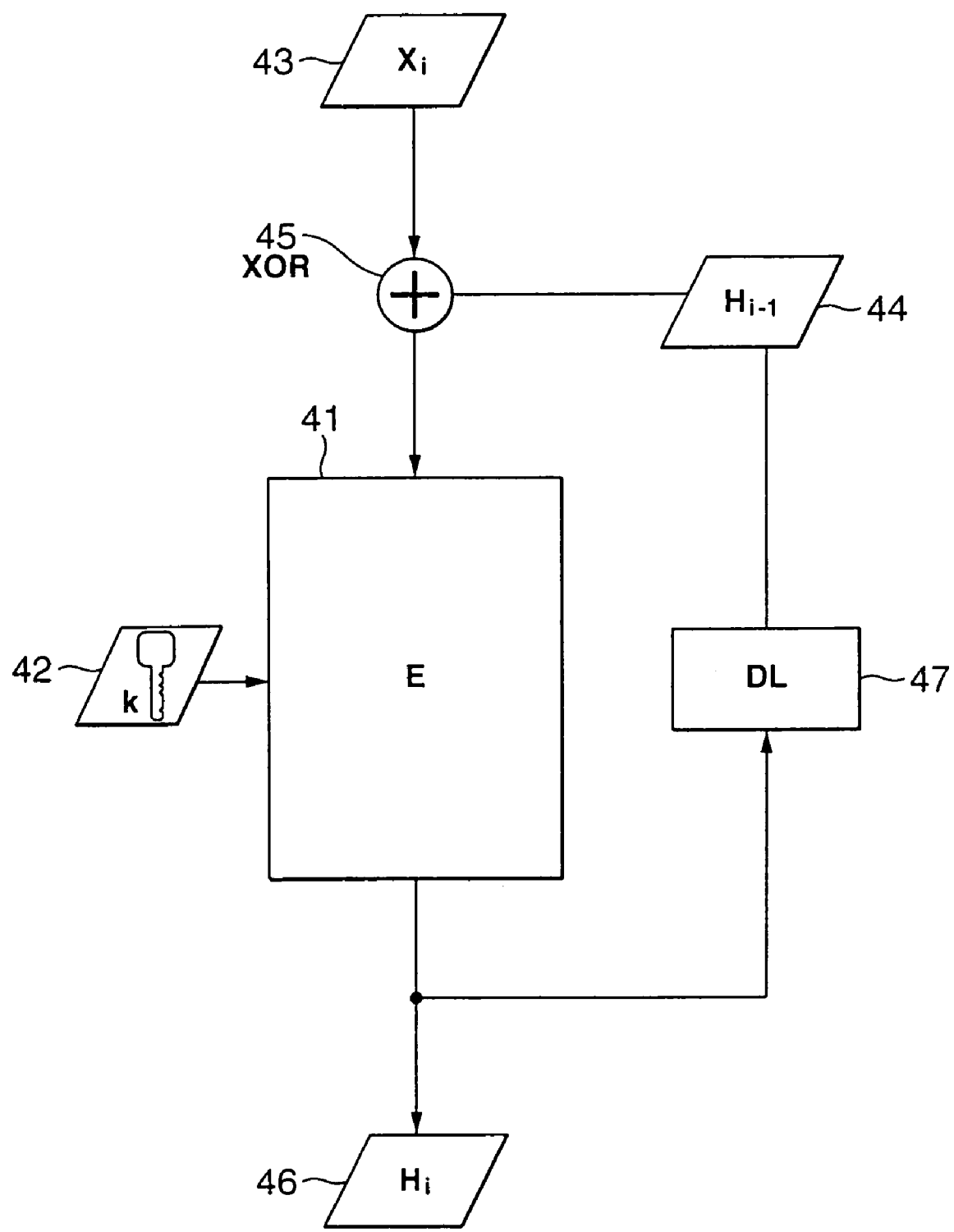
FIG. 9 shows the basic generating structure of a message digest according to the present invention.

FIG. 8 shows a basic structure for generating the message digest data according to the present invention. FIG. 9 chronologically shows the generation of the message digest data having the basic generating structure shown in FIG. 8. FIG. 8 shows an example of the Hash function in which the block encryption function is prepared using the CBC (Cipher Block Chaining) mode. For example, this may be used as a function for generating the message digest data.

Figure 10:
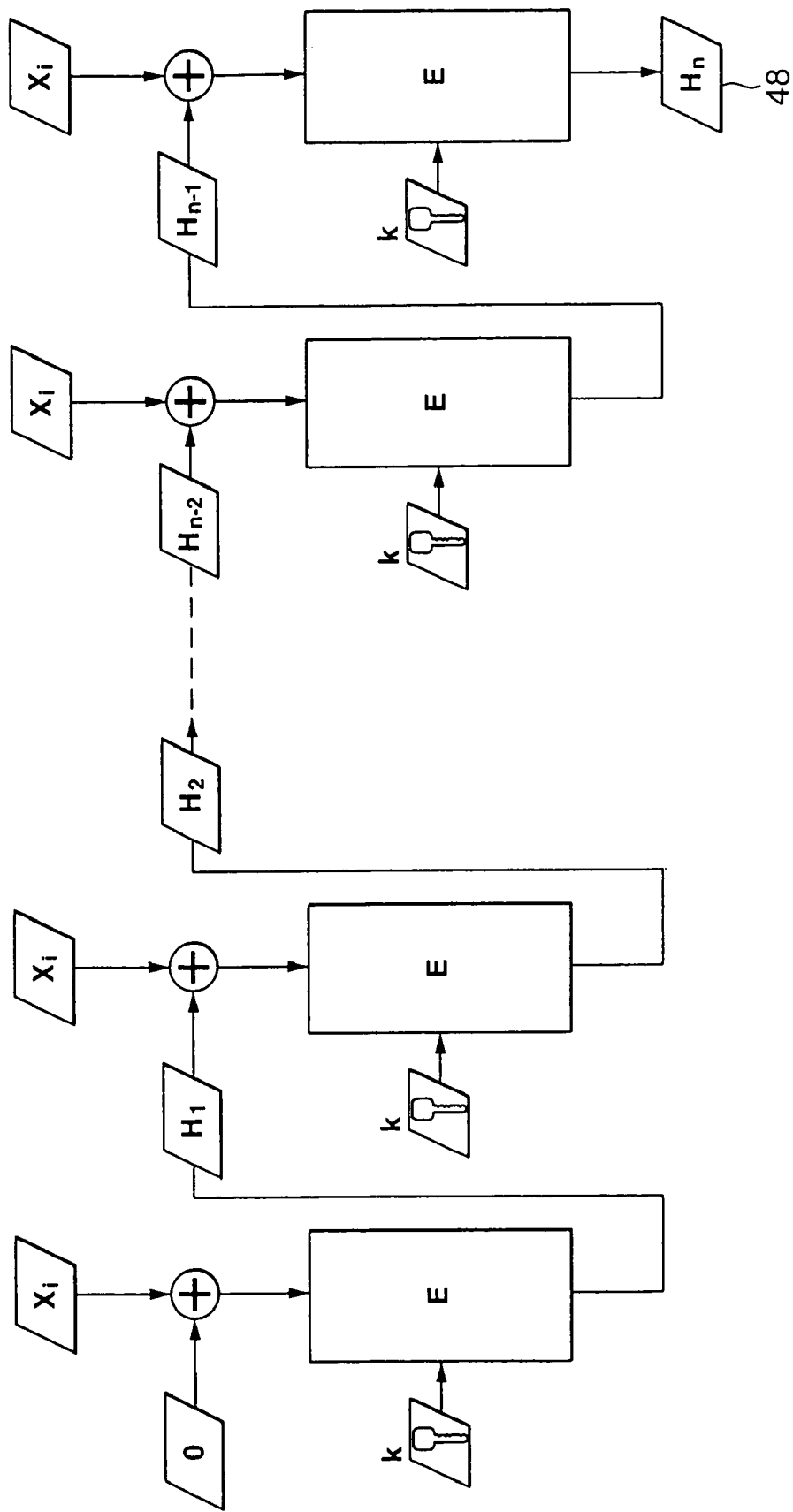
FIG. 10 shows the chronological generation process for generating the message digest having the basic structure shown in FIG. 9.

Referring to FIGS. 8 and 9, F41 is a block encryption function. For example, DES (Data Encryption Standard) or AES (Advanced Encryption Standard) have been known to date, while k 42 is key data used in the block encryption function and is kept confidential in the present case. Meanwhile, the block encryption function in general has an input and an output, each being of a certain length (bit length). This bit length is t bits. The key data may be as long as t, shorter than t (DES) or longer than t (AES). Referring to FIG. 9, Xi 43 denotes the input of t bits in length and Hi-1 44 is a directly previous output of E 41. As also shown in FIG. 10, if i is '1', the initial value of Hi-1 44 is fixed and may be '0' unproblematically in case of the Hash function, where '0' denotes a succession of a number of "0"s corresponding to the bit length. XOR 45 means taking an exclusive-OR (Exclusive OR) of Xi43 and Hi-1 44 on the bit basis. An output of XOR 45 is supplied as input to E 41 and is encrypted by the block encryption function E 41 using the key k 42 to give an output Hi 46. This output is again delayed by DL 47 so as to be used for the next calculation.

This is shown in FIG. 10 where an exclusive-OR of X1 and '0' is encrypted to give H1, and an exclusive OR of X2 and H1 is encrypted to give H2, and so forth. It is noted that X1, X2, . . . each denote a t-bit input and each also denote an element obtained on splitting a bit sequence composed of a sum total of (t×n) bits, as indicated by $$X=(X1, X2, \ldots, Xn-1, Xn) \quad (1)$$

where each element is made up by t bits. Here, a message that makes up a message digest is thought of as a bit sequence. This in general is an unproblematic supposition in handling digital data. If the length of the message is not an integer number multiple of t, additional bits are added as necessary to provide a bit length equal to a number equal to a multiple of t. It may be seen that X so formed has Xi as elements, as indicated by the equation (1). If this Xi is processed as shown in FIG. 10, using the basic structure shown in FIG. 9, an output Hn 48 is obtained which is influenced by all elements Xi of X. The output Hn 48, formulated in this manner, is thought of as message digest data representative of X.

The usage of Hn 48 is as follows: that is, Hn is sent to a counterpart party along with the message X and, if X has been changed, Hn' is re-calculated to permit detection that X has been changed. Thus, if the message X has been changed, but Hn' can be set to the original Hn, the change of X cannot be detected. However, this cannot be achieved so readily. If k 42 is made confidential, it is not that easy to back-calculate the exclusive OR of Xn and Hn-1 from Hn. It is because E 41 is a block encryption function and, if k 42 is made confidential, decryption becomes difficult.

It is noted that Hn 48, as the so completed message digest data, may act as a tool for verifying the validity (authenticity) of the message. It then becomes necessary to send this Hn to a location as needed in order to render it not readily susceptible to change. Here, an instance of the message digest data of the message (reference information) has been explained to illustrate that this may prove to be a tool in verifying the validity (authenticity) of the message. However, a variety of Hash functions for preparing the message digest data have been proposed and the method employing the block encryption function is merely illustrative. What is crucial is that the message digest data that enables adulteration of the message (reference information) to be detected to enable its validity (authenticity) to be verified can be formulated to an information volume smaller than in the original message.

The transmission by the recording medium of Hn 48, as the message digest data, referred to below simply as digest data, may be achieved by several methods. First, from the perspective of a file system, which controls the recording medium, there is a method of forming Hn 48 as a file in the file system. With this method, the digest data may be read/written easily, however, the digest data may also be readily changed. In this case, encryption in some form or other is necessary, such that it is necessary to be able to verify the validity (authenticity) of the message, inclusive of the digest data, within the encrypted file. Consequently, the digest data needs to be of such a structure that can be further encrypted and sent to the counterpart party (written on the disc and delivered or transmitted by communication). This encryption may employ common key data for the entire system or may employ key data proper to each recording medium.

There is also a method of placing the digest data in an area other than the area of the recording medium controlled by the file system. This method is featured by the fact that an apparatus for reading/writing the recording medium, referred to below as a drive, is able to read/write the digest data rather simply, however, such read/write is not possible via the file system. Thus, if the digest data is written in an area other than an area controlled by the file system, the digest data can be changed from outside except with significant difficulties.

Since it is the drive that reads/writes the digest data, various constraints can be imposed on the read/write of the digest data. Referring to the drawings, the method of placing, that is recording, the digest data in an area other than the area controlled by the file system, is hereinafter explained.

Figure 11:
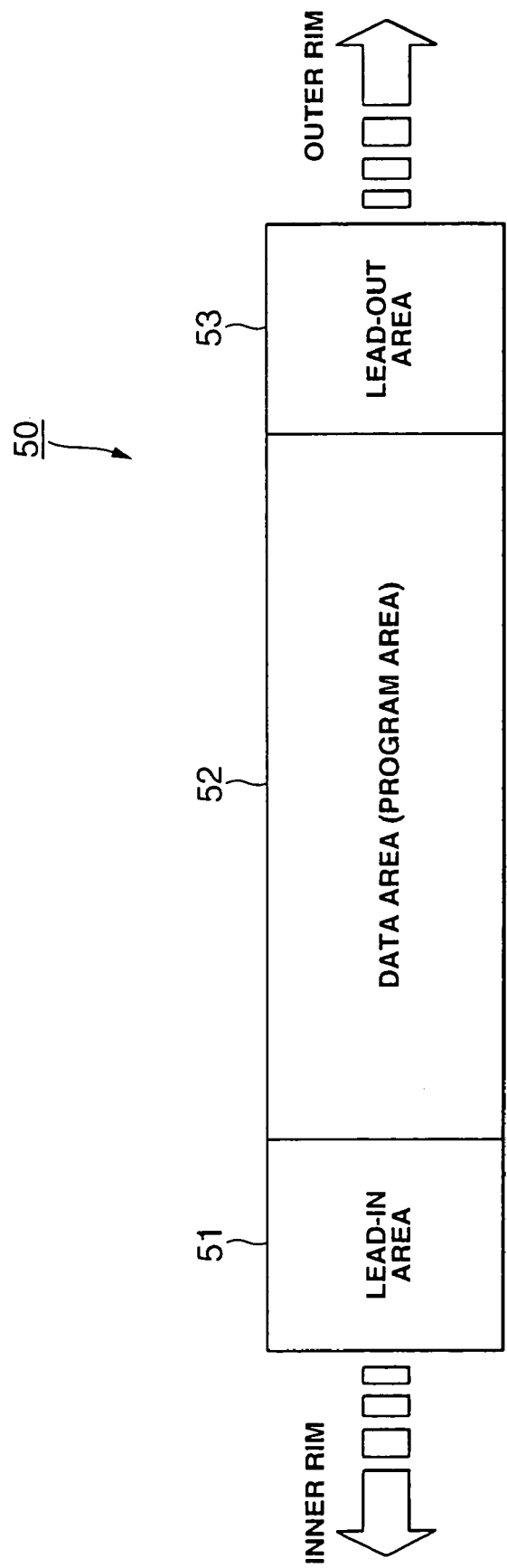
FIG. 11 shows the general format of data recorded within a disc.

There are a number of such areas other than those controlled by the file system for a disc. The following explanation is directed to the case of a disc 50. Referring to FIG. 11, the disc 50 is made up by a lead-in area 51, in which to record e.g. data indicating the leading end of the recording unit, a data area 52 in which to record user data, referred to below as a program area, and a lead-out area 53 provided to an outer side of the program area 52.

The lead-in area 51 is an area in which to record e.g. data indicating the position of the leading end of the recording unit. For example, the lead-in area is an area located at the leading end of each session of a CD-R disc for recording TOC (table-of-contents) data of the sessions, such as the track information or data indicating the start position. The session herein means a recording unit comprised of the lead-in area, program area and the lead-out area.

The program area 52 is an area provided to an outer side of the lead-in area 51 for recording user data, that is, an area in which data recording or reproduction is controlled by the file system.

The lead-out area 53 is an area located at the trailing end of the session, and is provided to an outer side of the program area 52.

In such disc, it is possible, by protocol, to formulate, at the outset, an area other than the program area 52, such as the lead-in area 51 or the lead-out area 53, or an area lying in the program area 52 but which is not controlled by the file system. For example, it is possible to provide an area not controlled by the file system, somewhere between the outermost part of the area controlled by the file system and the lead-out area 53, that is directly ahead of the lead-out area 53. It is furthermore possible, by protocol, to formulate, at the outset, an area uncontrollable by the file system, on a further inner side of the disc than the lead-in area 51 or on a further outer side of the disc than the lead-out area 53.

In using a semiconductor memory as a recording medium, it is similarly possible to provide an area uncontrollable by the file system, by protocol at the outset. For example, it is possible to provide an area uncontrollable by the file system, in a location downstream of the last address of the data write enable area, or in a location upstream of the initial address of the data write enable area.

In the area uncontrollable by the file system, thus provided, it is not wholly impossible to read or write data from outside, although such read/write is more or less difficult. Thus, by encryption followed by recording and by again verifying the validity (authenticity) on the message basis in the area, a higher reliability may be achieved. As for key data in performing the processing for encryption, the system-common cipher may be used, or key data proper to the recording medium may be used.

In the foregoing explanation, the digest data is recorded in the area controlled by the file system or in the area other than the area controlled by the file system and as distinct from the area controlled by the file system. Of course, the digest data may be recorded in both the area controlled by the file system and in the area other than the area controlled by the file system.

Meanwhile, it is possible to create certain key data from reference key data and the key data proper to the recording medium, using a function, such as Exclusive-OR, and to encrypt a list of key data which has encrypted the contents data. By so doing, the key data which has encrypted the contents and hence the contents data cannot be acquired except if the reference key data is acquired.

Figure 12:
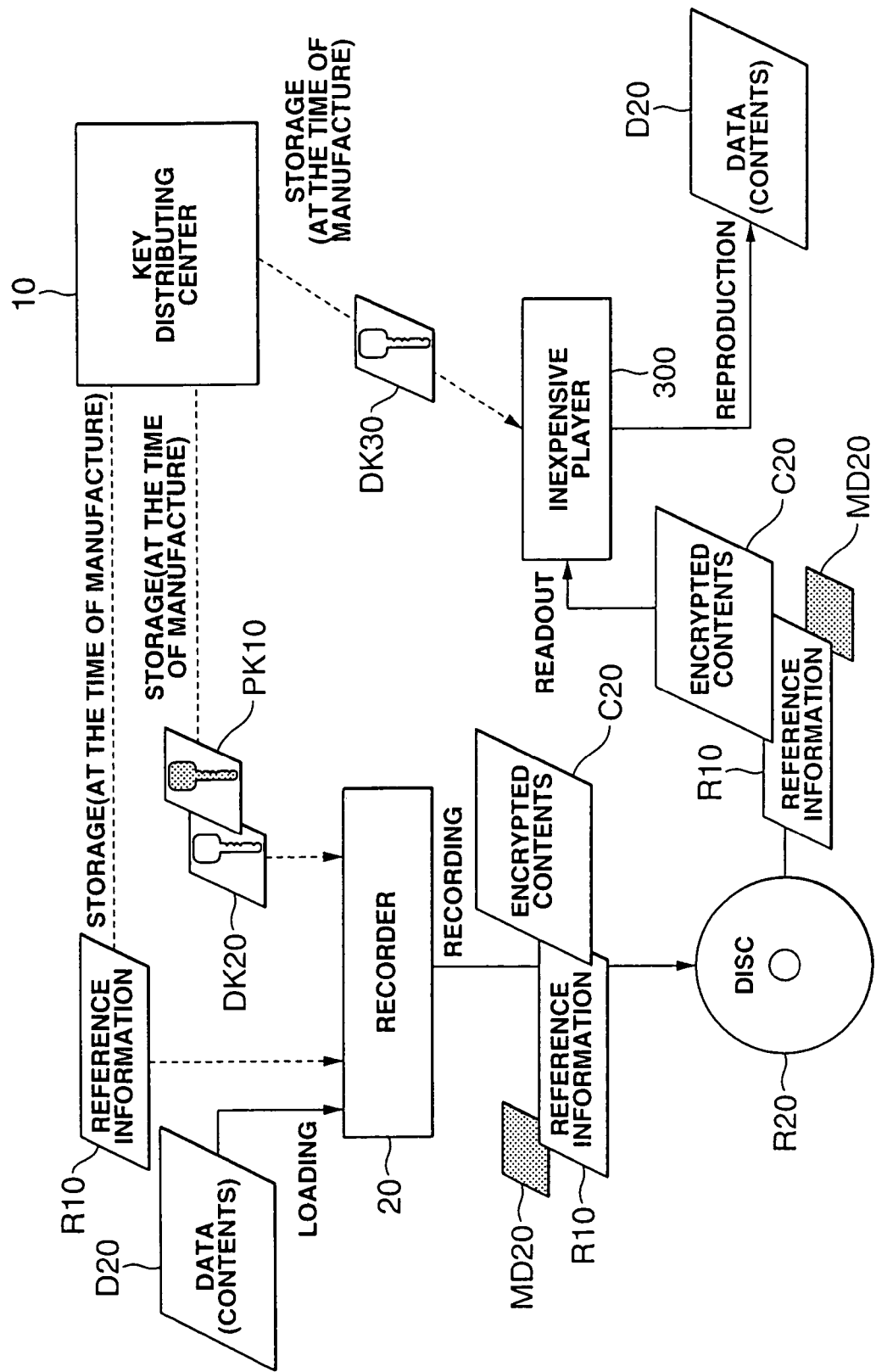
FIG. 12 shows the principle of the construction of the using method 2 in the data transmission system according to the present invention.

Referring to FIG. 12, the manner of using the message digest data in the overall flow in the data transmission system, explained with reference to FIG. 1, is now explained.

FIG. 12 shows the principle of construction of the use method 2 in the data transmission system of the present invention. Meanwhile, the functions of various component parts are the same as those in FIG. 1 and hence are not explained in detail. The sole point of difference between FIGS. 12 and 1 is that, for convenience in explanation, an inexpensive player 300 is shown as an inexpensive apparatus in place of the player 30.

In FIG. 12, data is recorded on the disc R20 by the recorder 20. The recorder writes encrypted contents data C20, which is the encrypted contents data C20, on the disc R20. Now, key data are formulated from the reference information R10, device key data DK20 and the key data proper to the disc (aforementioned key data inherent in the recording medium) to encrypt the contents data D20. Or, the list of key data is encrypted and recorded on the disc R20. The reference information R10 is also written, along with its signature, on the disc R20. The message digest data MD20 of the reference information R10 is also written thereon. The disc R20, on which data has been written in this manner, may be used even on the inexpensive player 300 which is unable to verify the authenticity of the signature of the reference information R10. Since the disc R20 is not necessarily furnished to the inexpensive player which is unable to verify the authenticity of the signature of the reference information R10, it is meaningful to accord the signature to the reference information.

If next the disc R20 is inserted into the inexpensive player 300, the reference information R10 is read in so that its validity (authenticity) is verified by the message digest data MD20. The contents key data are taken out from the reference information R10, using the device key data DK30, and are combined with the reference information R10, device key data DK20 and the key data proper to the disc to decrypt key data encrypted from the contents data D20. Using the key data, thus taken out, the encrypted contents data C20 are decrypted, thereby enabling the contents data D20 to be acquired.

If the message digest data are made up of elements for encryption, which are the same as the list of the key data encrypted, the key data are first taken out from the reference information and thereby the list of key data encrypted from the contents data and the message digest data are taken out. The validity (authenticity) of the reference information is again verified. The meaning of this process lies in the fact that adulteration of the reference information does not primarily lead to change in the key data taken out from the reference information. It is because the raison d'etre of the reference information is taking out the key data and the negation of the validity of the apparatus is realized by prohibiting the taking out of the key data. The purpose of the adulteration of the reference information is to make changes so that key data may be taken out even from the apparatus from which the key data cannot be taken out. There is no meaning in the adulteration which is unable to take out the key data. The message digest data is taken out with the produced key data to verify the validity (authenticity) of the reference information. If the reference information is not valid, readout of the contents data from the disc R20 is halted at this stage.

The operation of the use method of the data transmission system of the present invention 2 is now specifically explained by referring to a flowchart.

Figure 13:
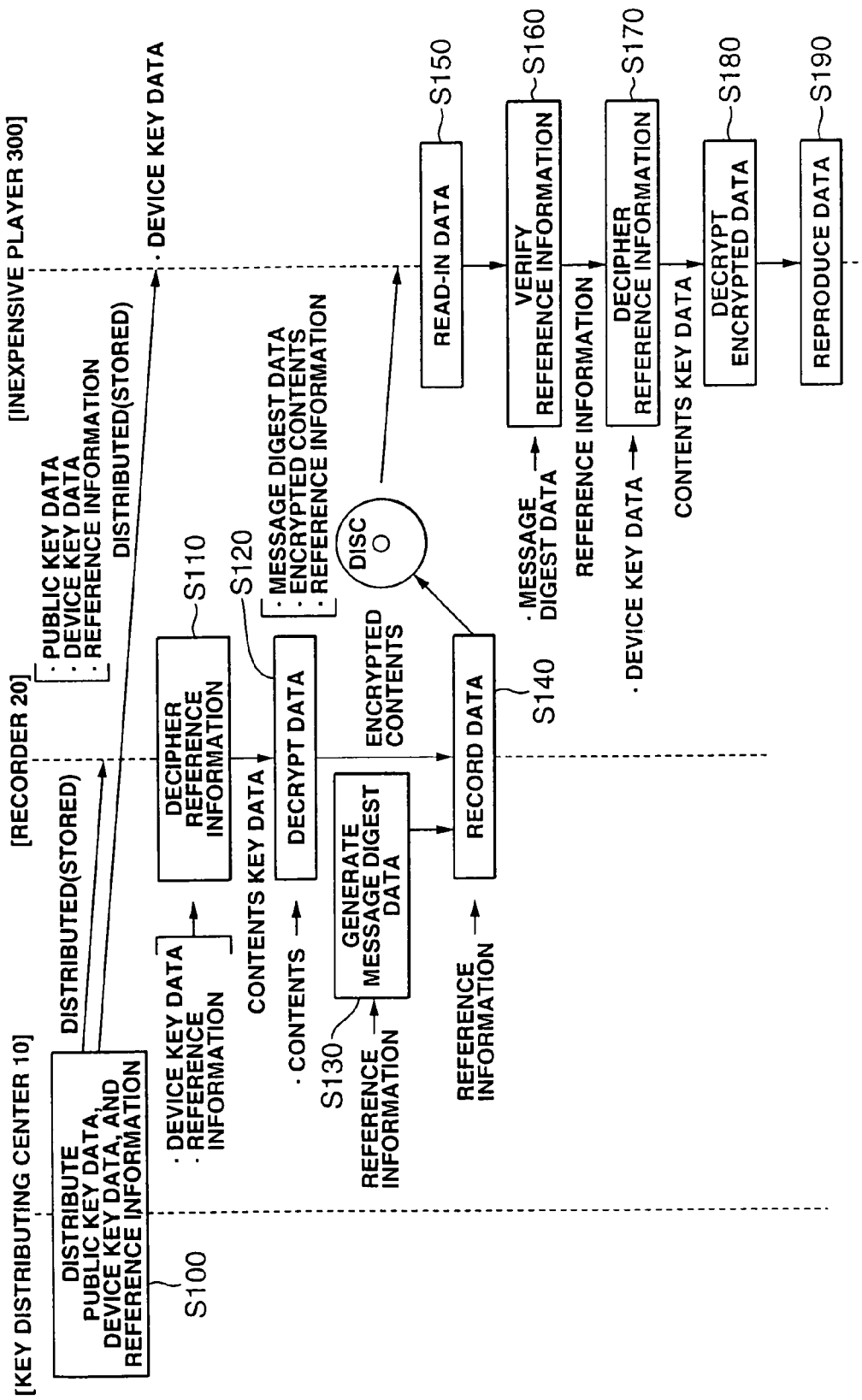
FIG. 13 is a flowchart showing a second basic operation of the data transmission system according to the present invention.

FIG. 13 is a flowchart showing the second basic operation of the data transmission system according to the present invention. It is noted that the explanation of the present flowchart is based on the respective apparatus and the respective functions shown in FIGS. 2, 3 and 13. The reference information verifying function of the inexpensive player 300 is the function of not verifying the signature of the reference information by the public key data PK10 in the reference information verifying unit 32 explained with reference to FIG. 3. The other functional units of the player 300 are the same as those of the player 30. In the explanation relevant to FIG. 12, explanation as to [preparing a key from the reference information R10, device key data DK20 and the key proper to the disc (the aforementioned key data proper to the recording medium), encrypting the contents D20 or encrypting the aforementioned list of the keys, and writing it on the disc R20] is not made and simply the basic operation of using the message digest data is shown.

[Step S100]

The public key data PK10, device key data DK20 and the reference information R10 are distributed by the key distributing center 10, at the time of manufacture of the recorder 20, and stored in a memory 38. On the other hand, the public key data PK10 and the device key data DK30 are distributed to the inexpensive player 300, at the outset, at the time of manufacture of the inexpensive player 300, and stored in the memory 36.

[Step S110]

When the contents data D20 is input via data input interface 21 to the recorder 20, the reference information deciphering unit 24 deciphers the reference information R10, stored in the memory 28, using the device key data DK20 stored in the memory 28. The reference information deciphering unit 24 deciphers the reference information R10, distributed (stored) in the step S100, using the device key data DK20, to generate the contents key data CK24. The so generated contents key data CK24 are output to the data encrypting unit 25. Meanwhile, a boot trigger for the reference information deciphering unit 24 may be afforded by the recorder 20. In this case, the generated contents key data CK24 is held until such time the contents data D20 is supplied, and is used when the contents data D20 is supplied. The details as to deciphering of the reference information R10 by the reference information deciphering unit 24 are as explained with reference to FIG. 4.

[Step S120]

The data encrypting unit 25 of the recorder 20 encrypts the contents data D20. Specifically, the data encrypting unit 25 performs decrypting processing on the contents data D20, supplied from the data input interface 21, using the contents key data CK24, supplied in the step S110 from the reference information deciphering unit 24, to generate the encrypted contents data C20. The data encrypting unit 25 sends the so generated encrypted contents data C20 to the data recording unit 27.

[Step S130]

The message digest generating unit 26 of the recorder 20 generates the message digest data MD20. When supplied with the contents data D20 via the data input interface 21, the message digest generating unit 26 generates the message digest data MD20, based on the reference information R10 stored in the memory 28. The so generated message digest data MD20 is output to the data recording unit 27. It is noted that the message digest data MD20 may be generated at the outset and stored in the memory 28.

[Step S140]

The data recording unit 27 of the recorder 20 records the reference information R10 and the contents data D20 on the disc R20. When supplied in the step S120 with the encrypted contents data C20 from the data encrypting unit 25, the data recording unit 27 records the encrypted contents data C20, along with the reference information R10, stored in the memory 28, on the disc R20. Meanwhile, in recording the reference information R10, the message digest data MD20, supplied from the message digest generating unit 26, or the message digest data MD20, read out from the memory 28, in the step S130, are also recorded on the disc R20, along with the aforementioned information.

[Step S150]

In the inexpensive player 300, the data read-in unit 31 reads out the external data, such as the reference information R10, message digest data MD20 or the encrypted contents data C20, recorded on the disc in the step S140, from the disc R20, to read-in these data as data. When the disc R20 is loaded on the inexpensive player 300, the data read-in unit 31 reads out the message digest data MD20 and the reference information R10, distributed by the key distributing center 10 and recorded on the disc R20, to output the so read out the message digest data and the reference information to the reference information verifying unit 32. The data read-in unit also readsin the encrypted contents data C20 from the disc R20 to output the read-in data to the data decrypting unit 34.

[Step S160]

In the inexpensive player 300, the reference information verifying unit 32 generates message digest data from the reference information R10 supplied in the step S150 from the data read-in unit 31. The reference information verifying unit 32 compares this message digest data to the message digest data MD20 supplied in the step S150 from the data read-in unit 31, by way of verification. The reference information verifying unit 32 outputs the reference information R10 to the reference information deciphering unit 33 if the two message digest data coincide with each other. If the two message digest data do not coincide with each other, the reference information verifying unit 32 terminates the processing operations, without doing anything. Meanwhile, the reference information R10 may be discarded, if so desired.

[Step S170]

In the inexpensive player 300, the reference information deciphering unit 33 deciphers the reference information R10, supplied in the step S160, using the device key data DK30 stored in the memory 36 in the step S100. The reference information deciphering unit 33 deciphers the reference information R10, supplied from the reference information verifying unit 32, using the device key data DK30, to generate the same contents key data CK33 as those used for encryption. The reference information deciphering unit 33 outputs the so generated contents key data CK33 to the data decrypting unit 34. The details of the deciphering of the reference information R10 by this reference information deciphering unit 33 are as explained with reference to FIG. 4.

[Step S180]

In the inexpensive player 300, the data decrypting unit 34 decrypts the encrypted contents data C20. The data decrypting unit 34 decrypts the encrypted contents data C20, supplied in the step S150 from the data read-in unit 31, using the contents key data CK33 supplied from the reference information deciphering unit 33 in the step S170, to generate contents data C20. The data decrypting unit 34 outputs the decrypted contents data C20 to the data reproducing unit 35.

[Step S190]

In the inexpensive player 300, the data reproducing unit 35 reproduces the contents data D20. When supplied in the step S180 with the contents data D20 from the data decrypting unit 34, the data reproducing unit 35 reproduces the data as the meaningful information. For example, if the information is the music information, it is converted by a D/A converter into analog audio signals, which analog audio signals are supplied via an amplifier to a loudspeaker so as to be output as audible sound. For example, if the information is the file type information, such as pictures or text, the signals are transmitted to the file system.

The foregoing description has been made of the recordable disc R20, on which recording may be made by the recorder 20. However, for omitting calculations for the message digest data MD20 of the reference information R10, it is also possible to deliver the signed reference information R10 from the key distributing center 10 along with the message digest data to a disc producer for recording on the replay-only disc in such a manner that the signed reference information with the message digest data may be distributed as the unrewritable information. In this case, it is possible for the player to use the reference information as it is because the reference information has been recorded on the replay-only disc and hence cannot be adulterated. If distinction cannot be made between the recordable disc and the non-recordable disc, it is necessary to verify the validity (authenticity) of the reference information based on the signature or the message digest data. Thus, the signature or the message digest data is used for verifying the validity of the reference information.

The foregoing description is centered about the optical disc. Alternatively, the recording medium may also be a semiconductor memory.

On the other hand, the read/write recording medium in the foregoing description is an optical disc or a semiconductor memory. Alternatively, the recording medium may also be a replay-only recording medium, on which recording has been made by a special device, such as a CD-ROM disc.

It is possible in this manner, even with an inexpensive player, to verify the validity (authenticity) of the reference information for verifying the validity of the apparatus, with the aid of the message digest data.

The above-described processing may be configured by a hardware using electronic components, such as logic circuit. The functions of the present invention may be implemented by software, in place of the hardware, by stating the operating procedure in a micro-program, and by executing the program on a micro-computer. If the program is to be executed by the micro-computer, the program is pre-stored in e.g. a ROM connected to or enclosed in the micro-computer, and is loaded and run on a main memory. The micro-program may be recorded on a computer-readable recording medium. The computer-readable recording medium may be exemplified by for example a magnetic recording medium, an optical disc, a magneto-optical recording medium or a semiconductor memory. The magnetic recording medium may be enumerated by a hard disc, a flexible disc (FD), a ZIP (a sort of the magnetic disc) and a magnetic tape. The optical disc may be enumerated by for example a DVD (Digital Versatile Disc), a DVD-RAM (DVD Random Access Memory), a CD-ROM (Compact Disc Read-Only Memory), a CD-R (CD Recordable) disc and a CD-RW (CD Rewritable) disc. The magneto-optical recording medium may be a MO (Magneto Optical) disc, while the semiconductor memory may be a flash memory.

For selling the micro-program, a portable recording medium, such as DVD or CD-ROM disc, having e.g. a micro-program recorded thereon, may be sold. The micro-program may be stored in a storage device of a server for transmission from the server to the client over the network.

The present invention is not limited to the embodiments described with reference to the drawings and, as may be apparent to those skilled in the art, various changes, substitutions or equivalents may be envisaged without departing from the scope and the purport of the invention as defined in the appended claims.

INDUSTRIAL APPLICABILITY

According to the present invention, in which message digest data of the reference information for verifying the validity (authenticity) of an apparatus is stored, in isolation from the reference information, in an inherent area of the recording medium, the validity of the reference information itself may be verified, at the time of data reproduction, using the message digest. By so doing, the validity of plural apparatus may be verified at the time of data transmission more efficiently at a lower cost.

The invention claimed is:

1. A data processing method comprising:
generating reference information including invalid device key data corresponding to at least one invalid apparatus of a plurality of apparatuses, valid device key data corresponding to at least one valid apparatus of the plurality of apparatuses and data encrypted from contents key data, by encrypting said contents key data using said device key data associated with the at least one valid apparatus of said plurality of apparatuses for which recording or reproduction is allowed;
supplying the generated reference information along with said device key data to said plurality of apparatuses;
said plurality of apparatuses decrypting said contents key data from the supplied reference information, using said device key data proper to said plurality of apparatuses;
encrypting or decrypting contents data using the decrypted contents key data;
wherein the device key data supplied and the reference information supplied are stored in a memory of each of said plurality of apparatuses; and
wherein data used for verifying whether or not the reference information supplied is valid is pre-stored in said plurality of apparatuses plural apparatus and wherein the validity of the reference information supplied is verified based on said verifying data.

2. The data processing method according to claim 1 wherein the contents data are encrypted using the decrypted contents key data and wherein the encrypted data and the reference information are recorded on a recording medium.

3. The data processing method according to claim 2 wherein data for determining whether or not the supplied reference information is valid is pre-stored in said plurality of apparatuses and wherein the validity of the reference information is determined based on said data used for verifying the reference information read out from said recording medium.

4. The data processing method according to claim 3 wherein, if the reference information supplied is determined to be valid, the contents key data is decrypted from said reference information using said device key data.

5. The data processing method according to claim 3 wherein, if the reference information supplied is determined to be not valid, the subsequent processing is discontinued.

6. The data processing method according to claim 3 wherein the verifying data is the key data used in encrypting the reference information.

7. The data processing method according to claim 1 wherein, if the reference information supplied has been determined to be valid, the version of the reference information supplied is compared to the version of the reference information stored in said memory and, when the version of the reference information supplied is newer than the version of the reference information stored in said memory, the reference information stored in said memory is updated to said supplied reference information.

8. The data processing method according to claim 1 wherein, if the reference information supplied has been determined to be not valid, the supplied reference information is discarded.

9. The data processing method according to claim 1 wherein said verifying data is key data used in encrypting the reference information.

10. The data processing method according to claim 1 wherein the contents data is encrypted using said decrypted contents key data, digest data is prepared based on said reference information and wherein the generated digest data, encrypted data and the reference information are recorded on a recording medium.

11. The data processing method according to claim 10 wherein digest data is generated from the reference information read out from the recording medium, the so generated digest data is compared to the digest data read out from the recording medium, and wherein, if the generated digest data is coincident with digest data read out from the recording medium, said contents key data is decrypted using the device key data.

12. The data processing method according to claim 10 wherein, if the generated digest data is not coincident with the digest data read out from the recording medium, the subsequent processing is discontinued.

13. A data processing method comprising:
generating reference information including data encrypted from contents key data using a plurality of supplied device key data proper to a plurality of apparatuses for which recording or reproduction is allowed, and inserting invalid key data corresponding to an invalid apparatus in a location of data encrypted from said contents key data using the device key data associated with said invalid apparatus for which recording or reproduction is not allowed;
supplying the generated reference information along with said device key data to said plurality of apparatuses plural apparatus;
said plurality of apparatuses decrypting the contents key data from the supplied reference information using the device key data proper to said plurality of apparatuses; and
encrypting or decrypting contents data using the decrypted contents key data;
wherein the device key data supplied and the reference information are stored in the memory of each of said plurality of apparatuses; and
wherein data for verifying whether or not the reference information supplied is valid is pre-stored in said plurality of apparatuses and wherein the validity is verified based on data used for verifying the supplied reference information.

14. The data processing method according to claim 13 wherein contents data are decrypted using the decrypted contents key data and wherein the encrypted data and the reference information are recorded on a recording medium.

15. The data processing method according to claim 14 wherein data for verifying whether or not the reference information supplied is valid is pre-stored in said plurality of apparatuses and wherein the validity is verified based on data used for verifying the reference information read out from the recording medium.

16. The data processing method according to claim 15 wherein, if the reference information supplied is determined to be valid, said contents data are decrypted from said reference information using said device key data.

17. The data processing method according to claim 15 wherein, if the reference information supplied is determined to be not valid, the subsequent processing operation is discontinued.

18. The data processing method according to claim 15 wherein said verifying data is key data used in encrypting the reference information.

19. The data processing method according to claim 13 wherein, if the reference information supplied has been determined to be valid, the version of the reference information supplied is compared to the version of the reference information stored in said memory and, when the version of the reference information supplied is newer than the version of the reference information stored in said memory, the reference information stored in said memory is updated to said supplied reference information.

20. The data processing method according to claim 13 wherein, if the reference information supplied is verified to be not valid, the supplied reference information is discarded.

21. The data processing method according to claim 13 wherein said verifying data is key data used in encrypting the reference information.

22. The data processing method according to claim 13 wherein the contents data is encrypted using said decrypted contents key data, said digest data is prepared based on said reference information and wherein the generated digest data, encrypted data and the reference information are recorded on a recording medium.

23. The data processing method according to claim 22 wherein the digest data is generated from the reference information read out from the recording medium, the so generated digest data is compared to digest data read out from the recording medium, and wherein, if the generated digest data is coincident with the digest data read out from the recording medium, said contents key data is decrypted using the device key data.

24. The data processing method according to claim 22 wherein, if the generated digest data is not coincident with the digest data read out from the recording medium, the subsequent processing is discontinued.

* * * * *